US012183194B2

(12) United States Patent
Groeneweg

(10) Patent No.: US 12,183,194 B2
(45) Date of Patent: Dec. 31, 2024

(54) DISTRIBUTED MAINTENANCE DECISION AND SUPPORT SYSTEM AND METHOD

(71) Applicant: Concaten, Inc., Golden, CO (US)

(72) Inventor: Kevin K. Groeneweg, Golden, CO (US)

(73) Assignee: Concaten, Inc., Golden, CO (US)

( * ) Notice: Subject to any disclaimer, the term of this patent is extended or adjusted under 35 U.S.C. 154(b) by 0 days.

(21) Appl. No.: 16/560,590

(22) Filed: Sep. 4, 2019

(65) Prior Publication Data

US 2020/0020229 A1 Jan. 16, 2020

Related U.S. Application Data

(63) Continuation of application No. 16/015,008, filed on Jun. 21, 2018, now Pat. No. 10,410,517, which is a continuation of application No. 15/180,474, filed on Jun. 13, 2016, now Pat. No. 10,008,112, which is a continuation of application No. 14/556,240, filed on Dec. 1, 2014, now Pat. No. 9,373,258, which is a continuation of application No. 13/151,035, filed on Jun. 1, 2011, now Pat. No. 8,902,081.

(60) Provisional application No. 61/350,802, filed on Jun. 2, 2010.

(51) Int. Cl.
*G08G 1/0967* (2006.01)
*G08G 1/00* (2006.01)

(52) U.S. Cl.
CPC ..... *G08G 1/0967* (2013.01); *G08G 1/096775* (2013.01); *G08G 1/20* (2013.01)

(58) Field of Classification Search
CPC .......... H04L 67/00; G08G 1/20; G08G 1/096; G08G 1/0967; G08G 1/096775
See application file for complete search history.

(56) References Cited

U.S. PATENT DOCUMENTS

| | | | |
|---|---|---|---|
| 3,160,964 | A | 12/1964 | Boyer et al. |
| 3,344,993 | A | 10/1967 | Wilder et al. |
| 3,420,451 | A | 1/1969 | Kahlbacher |
| 3,459,375 | A | 8/1969 | Goffin |

(Continued)

FOREIGN PATENT DOCUMENTS

| | | |
|---|---|---|
| CA | 2060418 | 5/1994 |
| CA | 2233689 | 4/1997 |

(Continued)

OTHER PUBLICATIONS

A brief seeking invalidation of U.S. Pat. Nos. 7,355,509; 7,714,705; 8,120,473; 8,284,037; and 8,497,769 for lack of subject matter eligibility.

(Continued)

*Primary Examiner* — Hoi C Lau
(74) *Attorney, Agent, or Firm* — Carl A. Hjort, III

(57) ABSTRACT

The present disclosure is directed to a computer that receives weather information from a weather service provider ("WSP") server and automatic vehicle locating system ("AVL") collected information from an AVL server, accesses a material performance specification for at least one treatment material, and determines, based on the weather information and/or AVL collected information and the material performance specification, a treatment recommendation for a selected roadway segment and/or route.

18 Claims, 9 Drawing Sheets

(56) References Cited

U.S. PATENT DOCUMENTS 3,519,169 A 7/1970 Holland
3,540,655 A 11/1970 Hinrichs
3,559,894 A 2/1971 Murray et al.
3,655,130 A 4/1972 Patrick
3,776,421 A 12/1973 Harrison et al.
3,776,431 A 12/1973 Riley
3,856,206 A 12/1974 Bell et al.
3,891,979 A 6/1975 Braun et al.
3,995,569 A 12/1976 Picardat
4,052,003 A 10/1977 Steffen
4,077,139 A 3/1978 Fagervold et al.
4,084,748 A 4/1978 Anderson et al.
4,176,791 A 12/1979 Cattaneo et al.
4,209,065 A 6/1980 Ledent
4,210,284 A 7/1980 Tarnay et al.
4,230,280 A 10/1980 Leigh et al.
4,234,109 A 11/1980 Goodhart
4,260,107 A 4/1981 Jackson
4,274,091 A 6/1981 Decker
4,274,901 A 6/1981 Elber
4,373,668 A 2/1983 Forbes et al.
4,376,007 A 3/1983 Eigenmann
4,391,393 A 7/1983 Filmyer
4,422,562 A 12/1983 Rawson
4,442,979 A 4/1984 Kupper
4,473,319 A 9/1984 Spangler
4,491,275 A 1/1985 Holsworth
4,492,952 A 1/1985 Miller
4,503,806 A 3/1985 Prusak et al.
4,523,280 A 6/1985 Bachman
4,529,336 A 7/1985 Shinozaki et al.
4,553,702 A 11/1985 Coffee et al.
4,577,781 A 3/1986 Braun
4,588,127 A 5/1986 Ehrat
4,678,056 A 7/1987 Kobari et al.
4,684,062 A 8/1987 Bagwell
4,690,553 A 9/1987 Fukamizu et al.
4,700,223 A 10/1987 Shoutaro et al.
4,700,895 A 10/1987 Takata
4,733,760 A 3/1988 Inagaki et al.
4,768,716 A 9/1988 Buchanan, Jr. et al.
4,803,626 A 2/1989 Bachman et al.
4,805,088 A 2/1989 Cross et al.
4,809,197 A 2/1989 Tashiro et al.
4,829,434 A 5/1989 Karmel et al.
4,829,684 A 5/1989 Gruber
4,881,371 A 11/1989 Haeder et al.
4,898,333 A 2/1990 Kime et al.
4,955,538 A 9/1990 Laube et al.
4,984,163 A 1/1991 Kuwana et al.
5,012,977 A 5/1991 Karklins et al.
5,028,017 A 7/1991 Simmons et al.
5,069,392 A 12/1991 Wise et al.
5,096,125 A 3/1992 Wise et al.
5,177,685 A 1/1993 Davis et al.
5,186,396 A 2/1993 Wise et al.
5,267,696 A 12/1993 Balmer
5,310,113 A 5/1994 Cowgur
5,318,226 A * 6/1994 Kime .................... E01H 10/007 239/677
5,331,331 A 7/1994 Wu
5,334,987 A 8/1994 Teach
5,343,744 A 9/1994 Ammann
5,366,039 A 11/1994 Sawada
5,389,727 A 2/1995 Searle
5,416,475 A 5/1995 Tolbert et al.
5,416,476 A 5/1995 Rendon
5,439,312 A 8/1995 Marcato
5,447,272 A 9/1995 Ask
5,449,049 A 9/1995 Every
5,452,966 A 9/1995 Swisher, Jr.
RE35,100 E 11/1995 Monson et al.
5,469,371 A 11/1995 Bass
5,515,043 A 5/1996 Berard et al.
5,515,623 A 5/1996 Weeks
5,521,594 A 5/1996 Fukushima
5,603,452 A 2/1997 Hester
5,606,307 A 2/1997 Kuan
5,619,193 A 4/1997 Doherty et al.
5,652,522 A 7/1997 Kates et al.
5,653,389 A 8/1997 Henderson et al.
5,684,476 A 11/1997 Anderson
5,699,056 A 12/1997 Yoshida
5,717,737 A 2/1998 Doviak et al.
5,745,051 A 4/1998 Doherty et al.
5,746,539 A 5/1998 Mara
5,774,070 A 6/1998 Rendon
5,794,172 A 8/1998 Matheson et al.
5,796,344 A 8/1998 Mann et al.
5,818,339 A 10/1998 Giles et al.
5,844,473 A 12/1998 Kaman
5,875,211 A * 2/1999 Cooper ................. H04W 84/08 375/213
5,904,296 A * 5/1999 Doherty ................. A01C 17/00 239/69
5,928,504 A 7/1999 Hembre et al.
5,931,393 A 8/1999 Alsip et al.
5,931,882 A 8/1999 Fick et al.
5,947,391 A 9/1999 Beck et al.
5,947,931 A 9/1999 Bierman
5,952,565 A 9/1999 Huber et al.
5,955,973 A 9/1999 Anderson
5,956,664 A 9/1999 Bryan
5,957,621 A 9/1999 Clark, Jr. et al.
5,982,325 A * 11/1999 Thornton ................ G01S 19/14 342/357.31
5,988,535 A * 11/1999 Kime .................... E01H 10/007 239/650
6,012,012 A 1/2000 Fleck et al.
6,029,111 A 2/2000 Croyle
6,064,970 A 5/2000 McMillan et al.
6,068,200 A * 5/2000 Kime .................... E01H 10/007 239/176
6,089,743 A 7/2000 McQuinn
6,092,745 A 7/2000 Seymour et al.
6,131,136 A 10/2000 Liebenow et al.
6,166,627 A 12/2000 Reeley
6,166,657 A 12/2000 Mann
6,173,904 B1 * 1/2001 Doherty ................. A01C 17/00 239/1
6,198,920 B1 3/2001 Doviak et al.
6,236,365 B1 5/2001 LeBlanc et al.
6,236,907 B1 5/2001 Hauwiller et al.
6,236,933 B1 5/2001 Lang
6,246,938 B1 6/2001 Giletta et al.
6,253,129 B1 6/2001 Jenkins et al.
6,317,684 B1 11/2001 Roeseler et al.
6,330,499 B1 12/2001 Chou et al.
6,354,786 B1 3/2002 Feller
6,356,823 B1 3/2002 Iannotti et al.
6,377,881 B1 4/2002 Mullins
6,384,739 B1 5/2002 Roberts
6,418,324 B1 7/2002 Doviak et al.
6,429,773 B1 8/2002 Schuyler
6,429,812 B1 8/2002 Hoffberg
6,437,735 B1 * 8/2002 McMahan ............. G01S 19/258 342/357.42
6,470,272 B2 10/2002 Cong et al.
6,472,982 B2 10/2002 Eida et al.
6,480,723 B1 * 11/2002 Davidson ................. H04B 1/38 370/277
6,497,368 B1 12/2002 Friend et al.
6,535,141 B1 3/2003 Doherty
6,538,578 B1 3/2003 Doherty
6,546,425 B1 4/2003 Hanson et al.
6,556,899 B1 4/2003 Harvey et al.
6,567,035 B1 5/2003 Elliott
6,574,548 B2 6/2003 DeKock et al.
6,577,943 B2 6/2003 Nakao et al.
6,587,785 B2 7/2003 Jijina et al.
6,611,739 B1 8/2003 Harvey et al.
6,611,740 B2 8/2003 Lowry et al.

(56) References Cited

U.S. PATENT DOCUMENTS

| | | | | |
|---|---|---|---|---|
| 6,628,921 | B1 * | 9/2003 | Vaddiparty | H04B 7/1851 455/12.1 |
| 6,631,322 | B1 | 10/2003 | Arthur et al. | |
| 6,640,187 | B1 | 10/2003 | Chenault et al. | |
| 6,647,270 | B1 | 11/2003 | Himmelstein | |
| 6,650,252 | B2 | 11/2003 | Miller, Jr. | |
| 6,700,493 | B1 | 3/2004 | Robinson | |
| 6,714,857 | B2 | 3/2004 | Kapolka et al. | |
| 6,732,032 | B1 | 5/2004 | Banet et al. | |
| 6,738,697 | B2 | 5/2004 | Breed | |
| 6,745,153 | B2 | 6/2004 | White et al. | |
| 6,791,456 | B2 | 9/2004 | Nakayama et al. | |
| 6,791,472 | B1 | 9/2004 | Hoffberg | |
| 6,799,097 | B2 | 9/2004 | Villarreal et al. | |
| 6,704,602 | B2 | 10/2004 | Impson et al. | |
| 6,801,837 | B2 | 10/2004 | Carlstedt et al. | |
| 6,826,405 | B2 | 11/2004 | Doviak et al. | |
| 6,840,098 | B2 | 1/2005 | Halliday | |
| 6,885,874 | B2 | 4/2005 | Grube et al. | |
| 6,919,821 | B1 | 7/2005 | Smith | |
| 6,933,920 | B2 | 8/2005 | Lacroix et al. | |
| 6,938,829 | B2 * | 9/2005 | Doherty | E01C 19/21 239/69 |
| 6,950,013 | B2 | 9/2005 | Scaman et al. | |
| 6,950,022 | B2 | 9/2005 | Breed | |
| 6,952,181 | B2 | 10/2005 | Karr et al. | |
| 6,977,597 | B2 | 12/2005 | Doherty | |
| 6,981,047 | B2 | 12/2005 | Hanson et al. | |
| 6,988,033 | B1 | 1/2006 | Lowry et al. | |
| 7,027,915 | B2 | 4/2006 | Craine | |
| 7,062,274 | B2 | 6/2006 | Shell et al. | |
| 7,064,657 | B2 | 6/2006 | Becker et al. | |
| 7,084,775 | B1 | 8/2006 | Smith | |
| 7,085,382 | B2 | 8/2006 | Terao et al. | |
| 7,092,803 | B2 | 8/2006 | Kapolka et al. | |
| 7,117,075 | B1 | 10/2006 | Larschan et al. | |
| 7,138,916 | B2 | 11/2006 | Schwart et al. | |
| 7,164,365 | B2 | 1/2007 | Doherty et al. | |
| 7,248,159 | B2 | 7/2007 | Smith | |
| 7,268,703 | B1 | 9/2007 | Kabel et al. | |
| 7,355,509 | B2 * | 4/2008 | Rennie | G08G 1/017 340/426.15 |
| 7,373,152 | B2 | 5/2008 | Oesterling | |
| 7,386,392 | B1 | 6/2008 | Kabel et al. | |
| 7,392,117 | B1 | 6/2008 | Bilodeau et al. | |
| 7,400,267 | B1 | 7/2008 | Doherty et al. | |
| 7,421,334 | B2 | 9/2008 | Dahlgren et al. | |
| 7,457,693 | B2 | 11/2008 | Olsen et al. | |
| 7,714,705 | B2 * | 5/2010 | Rennie | G08G 1/017 340/426.16 |
| 7,839,301 | B2 * | 11/2010 | Doherty | E01H 10/007 239/662 |
| 8,120,473 | B2 * | 2/2012 | Rennie | G08G 1/017 340/426.16 |
| 8,165,773 | B1 * | 4/2012 | Chavez | G01C 21/20 701/93 |
| 8,275,522 | B1 * | 9/2012 | Groeneweg | G06Q 10/06 701/50 |
| 8,284,037 | B2 * | 10/2012 | Rennie | H04L 67/12 340/426.16 |
| 8,497,769 | B2 * | 7/2013 | Rennie | H04L 67/12 340/426.16 |
| 8,902,081 | B2 * | 12/2014 | Groeneweg | G08G 1/096775 340/905 |
| 9,373,258 | B2 * | 6/2016 | Groeneweg | G08G 1/20 |
| 10,008,112 | B2 * | 6/2018 | Groeneweg | G08G 1/0967 |
| 10,410,517 | B2 * | 9/2019 | Groeneweg | G08G 1/096775 |
| 2002/0089445 | A1 * | 7/2002 | Odashima | G01C 21/26 342/357.25 |
| 2002/0094784 | A1 * | 7/2002 | Kashu | H04M 1/724 455/67.11 |
| 2002/0122394 | A1 | 9/2002 | Whitmore et al. | |
| 2003/0018428 | A1 * | 1/2003 | Knockeart | G08G 1/096872 342/357.31 |
| 2003/0125073 | A1 | 7/2003 | Tsai et al. | |
| 2004/0105608 | A1 | 6/2004 | Sloman | |
| 2004/0170181 | A1 | 9/2004 | Bogdon et al. | |
| 2004/0195357 | A1 * | 10/2004 | Doherty | B60T 8/172 239/172 |
| 2004/0264402 | A9 | 12/2004 | Whitmore et al. | |
| 2005/0002419 | A1 | 1/2005 | Doviak et al. | |
| 2005/0020308 | A1 | 1/2005 | Lai | |
| 2005/0043019 | A1 | 2/2005 | Nakamura et al. | |
| 2005/0066033 | A1 | 3/2005 | Cheston et al. | |
| 2005/0192725 | A1 | 9/2005 | Li | |
| 2005/0198257 | A1 | 9/2005 | Gupta et al. | |
| 2005/0223114 | A1 | 10/2005 | Hanson et al. | |
| 2005/0223115 | A1 | 10/2005 | Hanson et al. | |
| 2005/0243857 | A1 | 11/2005 | Hofstaedter et al. | |
| 2005/0246088 | A1 * | 11/2005 | Doherty | E01H 10/007 701/80 |
| 2006/0009213 | A1 | 1/2006 | Sturniolo et al. | |
| 2006/0022846 | A1 | 2/2006 | Tummala | |
| 2006/0023676 | A1 | 2/2006 | Whitmore et al. | |
| 2006/0046716 | A1 | 3/2006 | Hofstaedter | |
| 2006/0234658 | A1 * | 10/2006 | Sue | G01S 19/36 455/133 |
| 2007/0139168 | A1 * | 6/2007 | Rennie | H04L 67/12 340/425.5 |
| 2007/0219682 | A1 | 9/2007 | Kumar et al. | |
| 2007/0265780 | A1 | 11/2007 | Kesler et al. | |
| 2007/0296574 | A1 | 12/2007 | Smith et al. | |
| 2008/0033605 | A1 | 2/2008 | Daum et al. | |
| 2008/0157943 | A1 * | 7/2008 | Rennie | G08G 1/20 340/426.16 |
| 2008/0251614 | A1 | 10/2008 | Doherty et al. | |
| 2009/0173839 | A1 | 7/2009 | Groeneweg et al. | |
| 2010/0026551 | A1 | 2/2010 | Szwilski et al. | |
| 2010/0062739 | A1 * | 3/2010 | Hozumi | H04B 1/7113 455/343.1 |
| 2010/0182163 | A1 * | 7/2010 | Rennie | G08G 1/20 340/905 |
| 2011/0298638 | A1 * | 12/2011 | Groeneweg | G08G 1/096775 340/905 |
| 2015/0084789 | A1 * | 3/2015 | Groeneweg | G08G 1/20 340/905 |
| 2016/0300488 | A1 * | 10/2016 | Groeneweg | G08G 1/0967 |
| 2018/0301028 | A1 * | 10/2018 | Groeneweg | G08G 1/096775 |
| 2020/0020229 | A1 * | 1/2020 | Groeneweg | G08G 1/096775 |

FOREIGN PATENT DOCUMENTS

| | | |
|---|---|---|
| CA | 2272541 | 5/1998 |
| CH | 516050 | 11/1971 |
| DE | 3506229 | 8/1986 |
| DE | 3712452 | 11/1988 |
| FR | 2229812 | 12/1974 |
| FR | 2378132 | 8/1978 |
| FR | 2618543 | 1/1989 |

OTHER PUBLICATIONS

A brief opposing invalidation of U.S. Pat. Nos. 7,355,509; 7,714,705; 8,120,473; 8,284,037; and 8,497,769 for lack of subject matter eligibility.

An opinion invalidating U.S. Pat. Nos. 7,355,509; 7,714,705; 8,120,473; 8,284,037; and 8,497,769 for lack of subject matter eligibility.

A brief appealing district court's invalidation of U.S. Pat. Nos. 7,355,509; 7,714,705; 8,120,473; 8,284,037; and 8,497,769 for lack of subject matter eligibility.

A brief opposing appeal of district court's invalidation of U.S. Pat. Nos. 7,355,509; 7,714,705; 8,120,473; 8,284,037; and 8,497,769 for lack of subject matter eligibility.

Appeal decision affirming district court's invalidation of U.S. Pat. Nos. 7,355,509; 7,714,705; 8,120,473; 8,284,037; and 8,497,769 for lack of subject matter eligibility.

U.S. Appl. No. 12/147,837, Groeneweg et al., filed Jun. 27, 2008.

"Better bridge deicing on the way?" Better Roads, Jun. 1995, 1 page.

(56) References Cited

OTHER PUBLICATIONS

"Cellular technology has new niche, Phones offer mobile control in rural Colorado," by Dinah Zeiger, Denver Post, Aug. 21, 1994, 2 pages.
"Developments Improve Road Weather Information Systems," Better Roads, pp. 21 and 24 available, Oct. 1995.
"GIS: The World's ITS Backbone", Case Study, Environmental Systems Research Institute, Inc. 4 pages, 1997.
"Innovations in ITS," ITE Journal, Dec. 1996, 3 pages.
"ITS applications for magnetic tape", ITS: Intelligent transport systems, Jan./Feb. 1997, 1 page.
"Magnetic strips make snow ploughs smarter", ITS: Intelligent transport systems, Jan./Feb. 1997.
"Maintenance Management and Winter Operations," Transporation Research Record No. 1533, Transportation Research Board, 1996, 7 pages.
"Maintenance Management, Traffic Safety, and Snow Removal," Transportation Research Record No. 1352, Transportation Research Board, 1992, 92 pages.
"McCaw's AirData Network Gets Wheels; Showcases First CDPD-enabled Mobile Office Van from the Streets of Las Vegas at COMDEX/Fall '94", Business Wire, Nov. 14, 1994, pp. 1-2.
"Measuring Salt's Effectiveness in New York," Better Roads, Jan. 1995, 1 page.
"Our Mission: Traveler Services; 100% accurate, anywhere, anytime," VDOT Mar. 3, 2006, 16 pages.
"OutFront—What's Happening in the World of ITS—Study Predicts $400 billion market for ITS over the next 20 years" date unknown, 1 page.
"Phase Two Concept Highway Maintenance Vehicle Work Plan", Appendix G, Prepared by the Center for Transportation Research and Education, Ames, IA, Oct. 1996, 10 pages.
"Riding the Data Highway," Newsweek, p. 97, Mar. 21, 1994.
"Roads Report," edited by Larry Flynn, Roads & Bridges, Mar. 1993, 1 page.
"Rockwell rolls out DataTrax/GPS onboard computer with built-in GPS. (Rockwell Transportation Electronics; Global Positioning System)," Satellite News, Nov. 6, 1995, pp. 1-2.
"RWIS helps snow and ice control," Better Roads, Sep. 1994, 1 page.
"Snow and Ice Control: A Best Practices Review," May 1995, Office of the Legislative Auditor State of Minnesota, pp. 1-148.
"Snow Plowing goes high Tech," CTRE, Aug. 1997, pp. 1-16.
"Snow Removal and Ice Control Technology," Transportation Research Board, Conference Proceedings 16, 1996 pp. 1-174.
"Technology Transfer—NHI Reinforces Its Partnerships with Industry", Nov. 1996 Transporter, http://www.tfhrc.gov/trnsptr/rttnov96/rd961109.htm, accessed Nov. 2, 2009 2 pages.
"The Wisconsin DOT used an ice detection system and a snow forecasting model to aid in the dispatch of snow plows and deicers saving 4 hours per person for each significant storm (a value of around $144,000/storm), and approximately $75,000 in salt," RITA: Intelligent Transportation Systems, Mar./Apr. 1990, abstract only, 1 page.
"Traffic Sensor System," Better Roads, Dec. 1995, p. 15.
"UK proposes three private traffic control centres", ITS: Intelligent transport systems, Jan./Feb. 1997, 1 page.
"Water, Pure and Simple," Discover, pp. 87-88, Jul. 1996.
"Wetlands and road construction: Like Oil and Water?" Technology News, Aug.-Sep. 1997, pp. 1-12.
"What is a Road Weather Information System (RWIS)?" Road Weather Management Program, printed Oct. 30, 2009, 2 pages.
"Winter Maintenance for the New Millennium," U.S. Department of Transportation, Federal Highway Administration, Oct. 1998, pp. 1-4.
"Winter Maintenance Technology and Practices—Learning from Abroad," Research Results Digest, No. 204, Jan. 1995, NCHRP, pp. 1-16.
"Winter Maintenance Technology and Practices—Learning from Abroad," Road Management & Engineering Journal, Mar. 1, 1997, TranSafety, Inc., pp. 1-9.
1997 APWA North American Snow Conference, Apr. 27-30, 1997, Kansas City, Missouri, pp. 1-22.
Advertisement, "Are You Still Detecting Icy Roads Between Pavement Sensors by the Seat of Your Pants?" Vaisala, date unknown, 1 page.
Appendix A, Literature Search, date unknown, pp. 1-29.
Appendix B, Identify List of Desired Vehicle Capabilities, date unknown, 12 pages.
Appendix C, Research Funding Sources, 1996, 4 pages.
Appendix C: Motor Carrier Case Study, Evaluation Report vol. II—Case Study Field Notes by Western Highway Institute, ATA Foundation, Feb. 1994, pp. 1-108.
Appendix D, Select Private Sector Partners, 1996, 19 pages.
Appendix E, Develop Description of Systems, 1996, 6 pages.
Axelson, "Winter Road Maintenance System," Pennsylvania Department of Transportation, Maintenance Management, Conference Proceedings 5, Transportation Research Board, 1995, pp. 63-65.
Banasiak, "Snowfighters gather in Salt Lake City," Roads & Bridges, Jun. 1996, pp. 1-2.
Boselly et al., "Road Weather Information Systems vol. I: Research Report," Strategic Highway Research Program, Sep. 1993, pp. 1-219.
Boselly et al., "Road Weather Information Systems vol. II: Implementation Guide," Strategic Highway Research Program, Sep. 1993, pp. 1-82.
Boselly, "Benefit-Cost Assessment of the Utility of Road Weather Information Systems for Snow and Ice Control," Transportation Research Record 1352, 1992, pp. 75-82.
Boselly, "Road Weather Information Systems: What are they and what can they do for you?" Transportation Research Record 1387, 1993, pp. 191-195.
Bowman, Supplemental Advance Warning Devices: A Synthesis of Highway Practice, NCHRP Synthesis of Highway Practice, Issue No. 186, 1993, 92 pages.
Boynton "The View From Space Satellites keep eye on earthly activity", USA Today, date unknown, 2 pages.
Brochure, "Artificial Intelligence/Expert Systems," Kaman Sciences Corporation, Copyright 1991, 2 pages.
Brochure, "Better Roads . . . Safer Roads . . . More Cost Effective Roads . . . Through Innovations in Technology," Federal Highway Administration, date uknown, 4 pages.
Brochure, "Facts About Southwest Research Institute," Southwest Research Institute, San Antonio, Texas. Annual Report from Southwest Research Institute, 1996, 2 pages.
Brochure, "KEMS . . . A Geographic Information System Tailored for Emergency Management Applications," Kaman Sciences Corporation. Article, "Measuring Salt's Effectiveness in New York," Better Roads, Jan. 1995., 4 pages.
Measuring Salt's Effectiveness in New York, Better Roads, Jan. 1995.
Brochure, "Solving Today's Problems for Tomorrow's Safety," Control Products, Inc., date unknown, 2 pages.
Brochure, Enator Telub AB, "Mobile Road Condition Monitoring," Appears to be available as early as 1998.
Brochure, Southwest Research Institute—Guide, 8 pages, Aug. 1996.
Brochure, Southwest Research Institute—Guide, 8 pages, Jan. 1998.
Brown et al., "A Technical Report to the Secretary of Transportation on a National Approach to Augmented GPS Services," Dec. 1994, pp. 1-177.
Calla, "Microwave sensors (present and future)," Proc. Indian Acad. Sci (Engg. Sci.), vol. 6, Pt. 2, Jun. 1983, pp. 109-119.
Chapter 4: Introduction to Technologies, pp. 33-40.
Chapter 8: Winter Operations and Salt, Sand, and Chemical Management, date unknown pp. 1-68.
Chapter 9: Temperature Sensors, date unknown, pp. 1-3.
Chollar, "Revolution in Winter Maintenance," U.S. Department of Transportation, Federal Highway Administration, Winter 1996, vol. 59, No. 3, 3 pages.

(56) References Cited

OTHER PUBLICATIONS

Clarus Initiative, Read Ahead Package for Clarus Initiative Coordinating Committee Meeting #4, Aug. 8-9, 2006, Falls Church, VA, pp. 1-33.
Concept Paper, Northern Virginia Transportation Management Program: Enhancements for Incident Response and Emergency Operations Command/Control and Information Sharing, Jan. 25, 2001, 4 pages.
Crosby "Visibility a Key Component of Weather Systems,", Feedback on article, "Managing Winter Weather", Dec. 1996, 1 page.
Cumberledge et al., "Integration of Management Systems for Maintenance Activities," Pennsylvania Department of Transportation, Maintenance Management, Conference Proceedings 5, Transportation Research Board, 1995, pp. 26-30.
Dawley et al., "Ergonomic Factors in a one-person operation of snow plows with attached wing plows," Presentations from the 10th Equipment Management Workshop, Portland, OR, 1994, pp. 37-41.
Draft Proposal, Policy Recommendations to the RAQC Concerning the Comprehensive Long Range Air Quality Plan, from the Street Sanding/Cleaning Subcommittee City of Aurora Public Works Dept. (Colorado), Nov. 1, 1995, 2 pages.
Environmental Monitoring System (EMS), IPS MeteoStar, printed Oct. 30, 2009, 4 pages.
Excerpts from America Online: KKlean, Jun. 30, 1995, 6 pages.
Flanagan, "The Virtual Consolidated Operations Center," pp. 1-20, 1995.
Fleege "Equipment in Scandinavian Countries", Presentations from the 10th Equipment Management Workshop, Portland, OR, 1994, pp. 105-108.
Fleege et al., "Spreader Equipment for Anti-Icing", Maintenance Management and Safety, Transportation Research Record No. 1509, Transportation Research National Research Council, 1995, pp. 22-27.
GL 400 Spreader Control Presentation, Component Technology, Oct. 25, 1997, 12 pages.
Goodwin, "Best Practices for Road Weather Management," May 2003, pp. 1-131.
Hanbali et al., "Traffic vol. Reductions due to Winter Storm Conditions," Transportation Research Record 1387, 1993, pp. 159-164.
Highway Capacity Manual, Chapter 22: Freeway Facilities, 2000, 68 pages.
Hudson, "Let it Snow, let it snow, let it snow: 11 ways to maintain winter roads," http://americancityandcounty.com/mag/government_let_snow_let/, Apr. 1, 1996.
Hunter "1994 Midwestern States Equipment Management Conference" Presentations from the 10th Equipment Management Workshop, Portland, OR, 1994, pp. 111-113.
Hunter, "Snow Plow Trucks—Specifications for the Twenty-First Century," Presentations from the 10th Equipment Management Workshop, Portland, OR, 1994, pp. 31-35.
Hyman et al., "Field Testing and Evaluation of Innovative Technologies for Maintenance Data Collection," Transportation Research Board Conference Proceedings, 1995, No. 5, pp. 9-17.
ITIB Major IT Project Status Report for Jan. 2009—Summary, 9 pages.
Kuemmel "Managing Roadway Snow and Ice Control Operations," NCHRP Synthesis of Highway Practice, Issue No. 207, National Cooperative Highway Research Program, pp. 1-66.
Lasky et al., "Automated Highway Systems (AHS) Classification by Vehicle and Infrastructure," Advanced Highway Maintenance & Construction Technology Research Center, Jan. 25, 1994, 65 pages.
Manfredi et al., "Road Weather Information System Environmental Sensor Station Siting Guidelines," Report No. FHWA-HOP-05-026, Federal Highway Administration, Apr. 2005, U.S. Department of Transportation, 52 pages.
Manfredi et al., "Road Weather Information System Environmental Sensor Station Siting Guidelines," Version 2.0, Nov. 2008, U.S. Department of Transportation, 71 pages.
Marketing Document, Didactics Incorporated, "IR Applications for Ice and Snow Control," 1998, 29 pages.
Markow et al., "Highway Maintenance and Integrated Management Systems," Transportation Research Board Conference Proceedings, 1995, No. 5, pp. 31-37.
Montagne et al., "Oregon Green Light CVO Evaluation, Final Report, Detailed Test Plans 2 and 3, Evaluation of the Road Weather Information System (RWIS)" Jun. 2000, 89 pages.
Nixon "Foreign Technology Applications for the Winter Maintenance Concept Vehicle," Iowa Institute of Hydraulic Research, 1996, Appendix F, Foreign Technology Applications Report, 16 pages.
On-Site Weather, Weather or Not, date unknown, 1 page.
Pell, "An Improved Displacement Snowplow," Strategic Highway Research Program, May 1994, pp. 1-93.
Peterson, "Snow Plow Truck Cab Ergonomics: Summary," Presentations from the 10th Equipment Management Workshop, Portland, OR, 1994, p. 36.
Pilli-Sihvola et al., "Road weather service system in finland and savings in driving costs," Transportation Research Record No. 1387, 1992, pp. 196-200.
Pilli-Sihvola, "Weather-Related Traffic Management in the E18 Finnish Test Area," Finnish Naitonal Road Administration, 1997, pp. 12-15.
Pisano et al., "Intelligent Transportation Systems and Winter Operations in Japan," U.S. Department of Transportation Federal Highway Administration International Technology Exchange Program, Sep. 2003, 60 pages.
Press releases and product launches 2009, Vaisala to launch Road Weather Decision Support Sytem technologies, Jul. 9, 2009, 1 page.
Rasmussen, Erik; "Mobile Doppler Radar: A new tool to investigate tornadic storms"; NSSL Briefings; Fall/Winter 1995; pp. 10-11.
Reiter et al., "Artificial Intelligence-supported weather prediction for highway operations," Strategic Highway Research Program, 1992, p. 49, Abstract only.
Reiter et al., "Detailed weather prediction system for snow and ice control," Transportation Research Board, 1387, 1993, pp. 223-230.
Report on the 1998 Scanning Review of European Winter Service Technology, National Cooperative Highway Research Program, Research Results Digest, Apr. 1999, No. 238, 34 pages.
Road Condition-Weather Monitor: System to Determine Pavement Surface and Atmospheric Conditions, North Dakota DOT, 1 page, Sep. 1997.
Roosevelt et al., "Automatic vehicle location system in urban winter maintenance operations," Transportation Research Record 1741, Paper No. S00-0044, pp. 1-5.
Roosevelt et al., "Final Report: Lessons Learned from a Pilot Project of an Automatic Vehicle Location System in an Urban Winter Maintenance Operations Setting," Virginia Transportation Research Council, Apr. 2002, pp. 1-17.
Sail 2 Evaluation, Mn/DOT Contract No. 86353, Jan. 2007, 50 pages.
Scan FP 2000 Sensor Advertisement, Surface Systems Inc., date unknown, 2 pages.
Scapinakis et al., "Communications and Positioning Systems in the Motor Carrier Industry," Program on Advanced Technology for the Highway Institute of Transportation Studies University of California at Berkeley, PATH Research Report, 1992, pp. 1-82.
Smith, "A new paradigm for winter maintenance decisions," 1998 Transportation Conference Proceedings, pp. 1-4.
Smith, "From Concept to Reality: Advanced Technology and the Highway Maintenance Vehicle," Presentations from the 12th Equipment Management Workshop, 1998, pp. 4-14.
Smithson, "AASHTO's Winter Maintenance Program: A Proactive Approach to International Technology Transfer," Iowa Department of Transportation, 2000, pp. 15-21.
Smithson, "Americans can Learn a Lot from European, Japanese Snowfighters," Roads & Bridges, pp. 30-32 available, Jun. 1995.
Smithson, "DOTs push for better snow control vehicles," Better Roads, Jun. 1997, pp. 27-29.
Smithson, "Japanese and European Winter Maintenance Technology", Pennsylvania Department of Transportation, Maintenance Management, Conference Proceedings 5, Transportation Research Board, 1995, pp. 66-68.

(56) References Cited

OTHER PUBLICATIONS

Snow Removal and Ice Control Technology: selected papers presented at the Fourth International Symposium, Reno, Nevada, Aug. 11-16, 1996, Transportation and Research Board, published 1997, pp. 1-174.
Snowbreak Forest Book—Highway Snowstorm Countermeasure Manual, FHWA-PL-97-010, Japanese Original Printed Mar. 1990, Translated from Japanese, 1996, 107 pages.
Stern et al., "Vehicles as Mobile Sensing Platforms for Critical Weather Data," Briefing for the VII Weather Applications Workshop #1, Feb. 22, 2006, National Center for Atmospheric Research, Boulder, CO, pp. 1-35.
Surface Patrol™, available at http://www.ae-traffic.com/Surface_Patrol.html, printed Oct. 30, 2009, pp. 1-3.
Takeuchi et al., "Variation in motorist visual range measured by vehicle-mounted sensor," Transportation Research Record, 1387, 1993, pp. 173-177.
Task 9 Automatic Vehicle Locating System (AVL) Pilot Program for Snow Removal Operations, End of Program Report, Final, May 10, 2000, 17 pages.
The Intelligent Vehicle, May 1997, 1 page, printed Feb. 5, 2010.
Third International Symposium on Snow Removal and Ice Control Technology, Minneapolis, Minnesota, Sep. 14-18, 1992. Preprints: vol. 1 and vol. 2, Abstract only.
Thornes, "Cost-Effective Snow and Ice Control for the 1990s," Snow Removal and ice Control Technology, Transportation Research Record No. 1387, 1993, 7 pages.
Vaisala Guardian, "Road Weather Information Systems,", printed Oct. 30, 2009, 1 page.
Vaisala Guardian, The most effective and affordable road weather information system for cities, towns and counties, printed Oct. 30, 2009, 3 pages.
Vaisala U.S. National Lightning Detection Network, printed Oct. 30, 2009, 1 page.
VDOT VOIS/Weather Information Processing and Distribution (Inventory Element), Virginia.gov, printed Oct. 30, 2009, 4 pages.
Viking '79 Rover Study Final Report, vol. I, Summary, vol. II, Detailed Technical vol. NASA CR-132417, Martin Marietta Corporation, Mar. 1974, 4 pages.
Zeyher, "Just Drive!," Roads & Bridges, Apr. 2002, 3 pages.
"µWEBox Lite GSM/GPRS (GPS)—Revision 1.2", Comtech M2M, date unknown, pp. 1-60.
"µWEBox Lite Product FAmily", Comtech M2M, 2004, pp. 1-60.
"BlueTree Wireless Data—Wireless Modems", printed Jan. 4, 2007, pp. 1-4.
"GPRS GPS modem GPS GPRS modems—Comtech M2M", available at http://www.comtechm2m.com/gprs-modem/gprs-gps-modem.htm, printed Jan. 4, 2007, pp. 1-4.
"GPS Information", available at http://www.alltrackusa.com/gps_info.html, printed Jan. 4, 2007.
"GPS Tracking, GPS Vehicle Tracking products for monitoring of teen drivers", available at http://www.alltrackusa.com/, printed Jan. 4, 2007, pp. 1-4.
"Gps Wireless Modem—KnowledgeStorm Wireless Results for Gps Wireless Modem", printed Jan. 4, 2007, pp. 1-5.
"GPS-150 Automatic Vehicle Location Unit", CES Wireless Technologies Brochure, Jan. 9, 2003, 11 pages.
"Sierra offers GPS wireless modem", Globe Technolgy.com, Sep. 9, 2003, 1 page.
"TransCore Set to Develop DSRC, GPS, and Satellite Combined Communications Modem; Move Will Merge Disparate Telematics Technologies into One Device for In-Vehicle Safety Applications", Business Wire, Nov. 7, 2005, pp. 1-4.
"Ulster County Sheriff Media Release", dated Nov. 17, 2006, pp. 1-8.
"Using GPS for Vehicle Tracking, Asset Tracking and Fleet Management", available at http://www.cjseymour.plus.com/gps/gps.htm, dated Mar. 22, 2006, pp. 1-11.
"Vehicle Tracking Technology", available at http://www.trackmyvehicle.com/locate_technology.asp, printed Jan. 4, 2007, 2 pages.
Automatic Vehicle Locator System, Feb. 18, 2006, 1 page.
Campbell, Susan J., "TotalRoam Proves Successful Enough for Expansion in Three Organizations," Available at http://www.tmcnet.com/news/2006/02/14//1371250.htm, Feb. 14, 2006, 7 pages.
Dahlgren, LLC,2004, available at http://www.dahlgrenllc.com/AboutUs.htm, accessed Jun. 10, 2009, 1 page.
Falkenberg et al., "Precise Real-Time Kinematic Differential GPS Using a Cellular Radio Modem", Nov Atel Communications Ltd., presented at the IEEE Position Location an dNavigation Symposium PLANS 92, Monterey, CA, Mar. 24-27, 1992.
Junxion, Inc., "Field Commander junxion box remote management", Junxion, Inc., Seattle WA, 2005-2006, 1 page.
Junxion, Inc., "Junxion Box, User Guide", Model JB-110b (Wi-Fi and Ethernet LAN), Firmware Version 1.3, User Guide Revision B, Junxion, Inc., Seattle WA, 2004-2005, 48 pages.
Junxion, Inc., "Junxion Box, User Guide", Model JB-110e (Ethernet LAN only), Firmware Version 1.3, User Guide Revision A, Junxion, Inc., Seattle WA, 2004-2005, 44 pages.
Junxion, Inc., "Junxion Box; device durability testing", Junxion, Inc., Seattle WA, 2005-2006, 1 page.
Junxion, Inc., "Junxion Box; wireless WAN router", Junxion, Inc., Seattle WA, 2004-2006, 2 pages.
Junxion, Inc., "Junxion Complete; turn-key WWAN solutions", Junxion, Inc., Seattle WA, 2005-2006, 1 page.
Junxion, Inc., "Why Junxion? five reasons to consider", Junxion, Inc., Seattle WA, 2005-2006, 1 page.
Manpage of PPP, "PPPD", Available at http://ile.fing.edu.uy/ense/redatos/links/lab4/pppd.html, Aug. 3, 2005, 24 pages.
Mobile Competency, "Total Roam; The Business Case for Connection Persistence in Enterprise Wireless", White Paper prepared for Padcom, Mobile Competency Inc., Providence RI, 2005, 4 pages.
NetMotion Wireless Inc., "Best Practices for Wireless CRM", NetMotion Wireless Inc., Seattle WA, 2004, 5 pages.
NetMotion Wireless Inc., "Mobility XE; Get Connected. Stay Connected.", NetMotion Wireless Inc., Seattle WA, 2005, 6 pages.
NetMotion Wireless Inc., "Mobility XE Compatibility Guide", Available at http://www.netmotionwireless.com/resources/compatibility.asp, 2005, 2 pages.
NetMotion Wireless Inc., "NetMotion Mobility XE and Mobile IP", Available at http://www.netmotionwireless.com/lib/PrintPage.asp?REF=, 2005, 4 pages.
NetMotion Wireless Inc., "NetMotion Mobility XE Link Optimization for Wireless WANs", NetMotion Wireless Inc., Seattle WA, 2005, 5 pages.
NetMotion Wireless Inc., "NetMotion Mobility XE Scalability", NetMotion Wireless Inc., Seattle WA, 2005, 6 pages.
NetMotion Wireless Inc., "Policy Management Module", Available at http://www.netmotionwireless.com/product/info/policy_mgt_sheet.asp, 2005, 3 pages.
NetMotion Wireless Inc., "Technical Overview for Network Administrators", NetMotion Wireless Inc., Seattle WA, 2005, 9 pages.
NetMotion Wireless Inc., "The Key to Mobility", Available at http://www.netmotionwireless.com/products/mobility_keys.asp, 2005, 5 pages.
NetMotion Wireless Inc., "What's New in Mobility XE", Available at http://www.netmotionwireless.com/product/whatsnew_663.asp, 2005, 10 pages.
NetMotion Wireless Inc., "Wireless LANs: The Essentials for Saving Your Sanity", NetMotion Wireless Inc., Seattle WA, 2004, 6 pages.
NetMotion Wireless Inc., "Wireless Wide Area Networks: Trends and Issues", NetMotion Wireless Inc., Seattle WA, 2005, 6 pages.
North American Light Rail Terminology, Jun. 7, 2008, available at http://www.lightrail.com/terminology.htm, accessed Dec. 20, 2008, 26 pages.
Ortega et al., "Development of an In-House Automated Vehicle Location System", Proceedings of the 2003 Mid-Continent Transportations Research Symposium, Ames, Iowa, Aug. 2003, 7 pages.
Padcom Inc., "6100 Remote Access Router", Available at http://www.padcomusa.com/remote-access-router-6100.shtml, printed Mar. 24, 2006, 1 page.

(56) References Cited

OTHER PUBLICATIONS

Padcom Inc., "8100 Remote Access Router", Available at http://www.padcomusa.com/remote-acess-router-8100.shtml, printed Mar. 24, 2006, 2 pages.
Padcom Inc., "CDPD to Public Next-Generation Networks: Understanding the Transition", Padcom Inc., Bethlehem, PA, 2005, 9 pages.
Padcom Inc., "Point of Service Architecture", Available at http://www.padcomusa.com/rar-architecture-pos.shtml, printed Mar. 24, 2006, 1 page.
Padcom Inc., "Products; How TotalRoam Works", Available at http://www.padcomusa.com/products-how-tr-works.shtml, printed Mar. 24, 2006, 2 pages.
Padcom Inc., "Products; TotalRoam Connect; Mobile VPN", Available at http://www.padcomusa.com/products-tr-connect.shtml, printed Mar. 24, 2006, 3 pages.
Padcom Inc., "Products; TotalRoam Mobile Virtual Network (MVN)", Available at http://www.padcomusa.com/products-totalroam-mvn.shtml, printed Mar. 24, 2006, 4 pages.
"Intelligent Snow Plow" Intelligent Devices, available at http://www.intelligentdevicesinc.com/pdf/software/intelligent_snow_plow/idi_snow_plow.pdf, date unknown, pp. 1-2.
Padcom Inc., "Remote Access Routers", Available at http://www.padcomusa.com/remote-access-routers.shtml, printed Mar. 24, 2006, 1 page.
Padcom Inc., "TotalRoam; Technical Overview", Padcom Inc., Bethleham, PA, 2005, 46 pages.
Padcom Inc., "Use Case Scenario: POS", Available at http://www.padcomusa.com/rar-scenario-pos.shtml, printed Mar. 24, 2006, 1page.
Padcom Inc., "Use Case Scenario: Van", Available at http://www.padcom.com/rar-scenario-van.shtml, printed Mar. 24, 2006, 1 page.
Padcom Inc., "Vehicle Area Network Architecture", Available at http://www.padcomusa.com/rar-architecture-van.shtml, printed Mar. 24, 2006, 1 page.
Xie et al., "Going beyond automatic vehicle location" Nov. 2004, 10 pages.
Zoom: Driving Transportation Informatics, available at http://www.zoominfosystems.com/, accessed Jun. 10, 2009, 1 page.
"MDSS Road Condition—Chemical Concentration" CRREL, Apr. 2002, 8 pages.
"Update" ITS Minnesota vol. 2 Articles, No. 2, Spring Quarter 1998, 5 pages.
Background of the Invention for the above-captioned application (previously provided).
Smith et al., "Concept Highway Maintenance Vehicle, Final Report: Phase One," Center for Transportation Research and Education lowa State University, Apr. 1997, 92 pages.
Southeast Michigan Snow and Ice Management (SEMSIM), Final Evaluation at End of Winter Season Year 2004, Aug. 1, 2004, 90 pages.
Declaration of Kevin K. Groeneweg Under 37 CFR Section 1.98 (15 pgs.), including Exhibits A (10 pgs.), and B (1 pg.) 28 pages.
U.S. Appl. No. 60/656,650, filed Feb. 25, 2005, 24 pages.
Nov. 23, 2009 Amendment and Response from file wrapper of '705 Patent, 31 pages.
Claim Chart for CTRE Phase IV (SNQ 1), Exhibit CC-1 of Request for Reexamination of U.S. Pat. No. 7,714,705, 101 pages.
Claim Chart for CTRE Phase IV in view of CTRE Phase I, Phase II, and Phase III (SNQ 2) Exhibit CC-2 of Request Request for Reexamination of U.S. Pat. No. 7,714,705, 44 pages.
Claim Chart for CTRE Phase IV in view of Mahoney (SNQ 3) Exhibit CC-3 of Request Request for Reexamination of U.S. Pat. No. 7,714,705, 27 pages.
Claim Chart for CTRE Phase IV in view of Halliday (SNQ 4) Exhibit CC-4 of Request Request for Reexamination of U.S. Pat. No. 7,714,705, 34 pages.
Claim Chart for CTRE Phase IV in view of Trakit 25-A Manual (SNQ 5) Exhibit CC-5 of Request Request for Reexamination of U.S. Pat. No. 7,714,705, 8 pages.
Claim Chart for CTRE Phase IV in view of Biesecker (SNQ 6) Exhibit CC-6 of Request Request for Reexamination of U.S. Pat. No. 7,714,705, 10 pages.
Machine comparison of specification of 1650 Provisional Application and specification of U.S. Pat. No. 7,355,509, Exhibit OTH-1 of Request Request for Reexamination of U.S. Pat. No. 7,714,705, 45 pages.
"Concept Highway Maintenance Vehicle," Final Report: Phase Two, Center for Transportation Research and Education (CTRE), lowa State University, Dec. 1998, 148 pages.
"Highway Maintenance Concept Vehicle," Final Report: Phase Four, Center for Transportation Research and Education (CTRE), Iowa State University, Jun. 2002, 90 pages.
"Highway Maintenance Concept Vehicle," Final Report: Phase Three, Center for Transportation Research and Education (CTRE), Iowa State University, Mar. 2001, 170 pages.
Declaration of Marcia Brink establishing public availability of CTRE Phases I-IV, Exhibit PA-A5 of Request Request for Reexamination of U.S. Pat. No. 7,714,705, 2 pages.
Mahoney "An Advanced Weather Information Decision Support System for winter Road Maintenance," National Center for Atmospheric Research ITS Rocky Mountain Confernece, Salt Lake City, Oct. 2-4, 2002, available at http://www.itsrm.org/downloads/2002%20Proceedings/Bill%20Mahoney.pdf, 33 pages.
Declaration of Traci Ulberg establishing public availability of Mahoney, Exhibit PA-B2 of Request Request for Reexamination of U.S. Pat. No. 7,714,705, 2 pages.
Trakit-25A Manual, Jan. 19, 2004, available at http://www.idaco.com/TN-SA.pdf, 22 pages.
Biesecker "Broadband Wireless, Integrated Services, and Their Application to Intelligent Transportation Systems" Report of Center for Telecommunications and Advanced Technology, Jun. 2002, 124 pages.
Mahoney et al. "The Winter Road Maintenance Decision Support System (MDDS) Project Update and Future Plans," National Center for Atmospheric Research, published prior to 2006, available at ams.confex.com/ams/pdfpapers/51856.pdf, 8 pages.
Schell "Real Time, Real Rugged, And Real Profits," Business Solutions, Mar. 1, 2003, available at http://www.bsminfo.com/article.mvc/Real-Time-Real-Rugged-And-Real-Profits-0001?VNETCOOKIE=NO, 2 pages.
Schneider et al. "Thermal Mapping for MDSS" Vaisala Road Weather Systems, 2003, 25 pages.
"Improving Snow Plow Design: Highway Maintenance Concept Vehicle Phase V" Prepared for the Clear Roads Program, ctre Center for Transportation Research and Education, Iowa State University, Apr. 2006, 29 pages.
"Improving Snow Plow Design: Highway Maintenance Concept Vehicle Phase V" Meeting Minutes from the Design Charrette Held in Des Moines Iowa Apr. 26 & 27, 2006, Prepared for the Clear Roads Program, ctre Center for Transportation Research and Education, Iowa State University, Apr. 2006, 21 pages.

* cited by examiner

DISTRIBUTED MAINTENANCE DECISION AND SUPPORT SYSTEM AND METHOD

CROSS REFERENCE TO RELATED APPLICATION

The present application is a continuation of U.S. Ser. No. 16/015,008, filed Jun. 21, 2018 now U.S. Pat. No. 10,410,517, issued Sep. 10, 2019, which is a continuation of U.S. Ser. No. 15/180,474, filed Jun. 13, 2016 now U.S. Pat. No. 10,008,112 issued Jun. 26, 2018, which is a continuation of U.S. application Ser. No. 14/556,240, filed Dec. 1, 2014 now U.S. Pat. No. 9,373,258 issued Jun. 21, 2016, which is a continuation of U.S. application Ser. No. 13/151,035 filed Jun. 1, 2011 now U.S. Pat. No. 8,902,081 issued Dec. 2, 2014 which claims the benefits of U.S. Provisional Application Ser. No. 61/350,802, filed Jun. 2, 2010, all entitled "Maintenance Decision Support System and Method", and which are incorporated herein by this reference in their entirety.

FIELD

The disclosure relates generally to maintenance vehicles and particularly to maintenance vehicles for controlling snow and ice accumulation on roadways.

BACKGROUND

To date, maintenance systems, such as those described by the U.S. Pat. No. 7,714,705, which is incorporated herein fully by this reference, have been based from a central server, which is ingesting both weather information received from a weather service provider ("WSP"), such as the National Weather Service ("NWS") and weather and maintenance information received from maintenance vehicles and remotely located sensors and sensor arrays, processing the ingested information, and attempting to provide recommendations to snow and ice maintenance vehicles in the field. The recommendations are commonly based on anticipated conditions and the last information the AVL server received from the vehicles and sensors and sensor arrays.

In one application, weather information is typically ingested from the NWS and other sources into a central server controlled by a meteorological service provider (the meteorologist's central server or "MCS"). The weather information typically includes various reporting types ranging from data from weather stations to visual observations. The MCS also ingests data from the field as last reported by maintenance vehicle operators and/or from assumptions within the system (e.g., one or more of the following: location, lane, weather condition, road condition, ambient and surface temperatures, blade and/or other vehicular or engine information, wind directions and speeds, etc.). Data is typically processed by the MCS system on a periodic basis (e.g., every 1-20 minutes with some direct and indirect data being updated even less frequently). Meterologists and/or systems review the data and try to establish from the historic record what has been done, predict what field operators should be seeing and expecting, and create forecasts and recommendations for what they should do, and then send applicable information back out to the field.

The system can have problems. For example, one problem with the current system is that operators, when out of communication with the central server (e.g., out of cellular coverage area, unavailability of radio data channel, and the like) have no access or guidance. Other problems with these paradigms include without limitation: (1) the delay in receiving and ingesting the weather and field information, (2) the delay in processing the same, (3) the delay in creating forecasts and recommendations based on the same, (4) the delay in getting that information back out to the field, and (5) the delay in then responding to a change in variables if, for example, the operator reports the road is dry rather than wet (such as might be the case if the storm unexpectedly tracks south and/or with virgo). When in the latter case, the operator enters or reports dry roads from the field, the systems typically have to first qualify and then repeat the above process, sometimes with delays of 20 minutes or more. The delay can prevent effective control of snow and ice accumulation on roadways and cause extreme danger to motorists.

SUMMARY

These and other needs are addressed by the various aspects, embodiments, and/or configurations of the present disclosure. The disclosure is directed generally to treatment recommendations for maintenance vehicles, particularly snow and ice maintenance vehicles.

In an embodiment, a method and distributed maintenance decision support system ("MDSS") are provided that include the operations:

(a) receiving, by an on-board computer in a selected maintenance vehicle, one or more of weather information from a weather service provider ("WSP") server, automatic vehicle locating system ("AVL") collected information from an AVL server, and information collected locally by the on-board computer;
(b) accessing, by the on-board computer, a material performance specification for one or more treatment material(s) on-board the selected maintenance vehicle; and
(c) determining, based on the received information and the material performance specification, a treatment recommendation to be followed by the selected maintenance vehicle for a selected roadway segment and/or route.

In an embodiment, a method and distributed MDSS are provided that include the operations:

(a) receiving, by a computer, weather information from a WSP server and AVL collected information from an AVL server;
(b) accessing, by the computer, a material performance specification for one or more treatment material(s); and
(c) determining, based on the weather information, AVL collected information, and the material performance specification, a treatment recommendation for a selected roadway segment and/or route.

The distributed maintenance system disclosed herein can obtain and locally process weather information, vendor information, collected historic AVL and/or other MDSS information, and/or sensor-based and visually collected information to determine and provide anti- and de-icing material treatment recommendations. The system can thus provide weather and/or other data points to the maintenance vehicles in the field, enable the maintenance vehicles to carry more relevant information, and, with such data and information, allow operators in, the maintenance vehicles, when needed and convenient, to input selected variables and then process and analyze, from their vehicles, the same immediately and directly in the field. This is directly contrary to central server-based maintenance systems, which ingest and process both weather and maintenance information to provide recommendations to the field. The distributed maintenance system can dramatically simplify, speed up, and improve the quality of in-vehicle support available to operators. In some configurations, the local processing is done in an on-board intelligent modem, such as an in-vehicle SMD modem sold by IWAPI, Inc, (which integrates both full computing and modem functionality in the truck as further described U.S. Pat. No. 7,714,705). The intelligent modem can be particularly capable of this type of field functionality and of carrying and taking live feeds and/or updates of external data and information, presenting the same in processed and/or unprocessed form, and transmitting and/or storing data points, treatment recommendations and actual actions taken and interfacing with one or more central servers and/or systems (weather, accounting, maintenance or otherwise) for concurrent and/or subsequent review, analysis and reports.

In a configuration, the distributed MDSS takes a feed of basic weather and associated weather information directly into the maintenance vehicle(s) (often without the feed first being processed by a server), where the operator can then use such data along with information from his own senses to enter actual (not guessed or historic) information into the on-board modem system to, for example but without limitation, compute and receive a list of recommended de- or anti-icing materials to use, to evaluate and/or receive a treatment recommendation on the quantity of de- or anti-icing material to put down, evaluate whether or to what extent the operator should delay treating or pre-treat a given roadway, to graph and/or compare, such as visually, treatment material profiles (freeze characteristics at various temperature and dilution rates) to current and predicted temperatures, and the like.

In a configuration, the on-board modem downloads and/or carries one or more de- or anti-icing material profiles for the de- or anti-icing materials most commonly used, with additional treatment material profiles or specifications being available via download as needed, as available, and/or as revised. Management and treatment material suppliers can adjust treatment material specifications and/or profiles for characteristics, concentrations, and dilution rates, and/or other factors. Predicted storm start and stop times and other applicable weather information, such as predicted temperatures, wind speed, wind direction, solar thermal variable (e.g., amount of sun and/or cloud cover which can be numerically represented on a selected numerical scale), are downloaded from the National Weather Service ("NWS") and/or other meteorological or weather service providers. Relevant data points may vary depending on the level of service and/or sophistication desired. AVL collected information regarding which roads and/or segments have already been worked is downloaded from the same or other systems, with applicable time, treatment material and quantities used. The modem or similar in-vehicle computer device itself collects (locally) information from various on-board sensors, including ambient and/or surface temperatures, humidity, and the like.

Operators (e.g., supervisors (by logging in remotely) and/or plow operators) seeking an update and/or guidance on recommended treatment materials and/or quantities, can at any time request an update, via a user interface (e.g., by touching a touch screen monitor (or otherwise—e.g., buttons, toggles, mouse cursor, keyboard, and voice commands)), input actual observed conditions (e.g., one or more of road condition, weather condition, snow on the road, estimated wind speed (if no sensor), drifting conditions, density of traffic, and/or other applicable factors) and quickly compare and/or recompute and/or display both the forecast conditions and the treatment recommendations based on the applicable profiles, data, other information, and inputs recorded.

As disclosed in copending U.S. application Ser. No. 12/147,837, filed Jun. 27, 2008, now U.S. Pat. No. 8,275,522, which is incorporated fully herein by this reference, radar (fixed and/or loop) can likewise be displayed directly from internal and/or third party systems (including without limitation NWS, internal meteorologists, and other weather service providers). As mentioned, relevant data points can vary depending on the level of service and/or sophistication the client desires in their application.

The display monitor can be used to toggle between applicable displays, and additional information can be pulled from files already on the system or specially downloaded from external systems located across the country or around the world. Visual and/or audible alerts can be provided.

Data points, treatment recommendations, and actual actions taken can be sent live, or via store-and-forward, to one or more central servers and/or systems (accounting, maintenance or otherwise) for concurrent and/or subsequent review, analysis and/or reports.

The source of weather information can be like an accounting system, asset management, treatment materials management, or other processing and data system to which the in-vehicle units can transmit to and receive from. Processing, recommendations and general fleet management is normally still conducted from and/or through central systems, but the above process can enable operators in the field to much more quickly adjust parameters to the conditions they are encountering and obtain more timely, meaningful treatment recommendations and other information. Global Positioning System ("GPS")/Automated Vehicle Locating ("AVL") functionality is typically still provided with data, recommendations, actions, and/or other parameters recorded by location and time and collected for further review, analysis, and reporting requirements.

The distributed MDSS can also reduce or eliminate much of the expense and complexity of current meteorologist's central server or MCS where, from a given location, staff attempt to predict conditions at locations across the country and make recommendations that may or may not bear on actual fact. The distributed MDSS can combine human senses, with sensors and information that can be made available and processed in the vehicle efficiently, based on observed current conditions. It can eliminate an existing layer of unnecessary processing, delay and expense, and directly link and allow the maintenance vehicles to carry, compute, and/or display, even when out of coverage, information and treatment recommendations relevant to vehicle performance or other operation. It can enable clients to select and interchangeably choose weather service providers who most accurately meet their forecasting needs and/or save resources by drawing on the expertise and resources readily available internally and/or from the NWS and others.

These and other advantages will be apparent from the disclosure.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is presented in terms of exemplary embodiments, it should be appreciated that individual aspects of the disclosure can be separately claimed.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

DETAILED DESCRIPTION

System Overview

Figure 1:
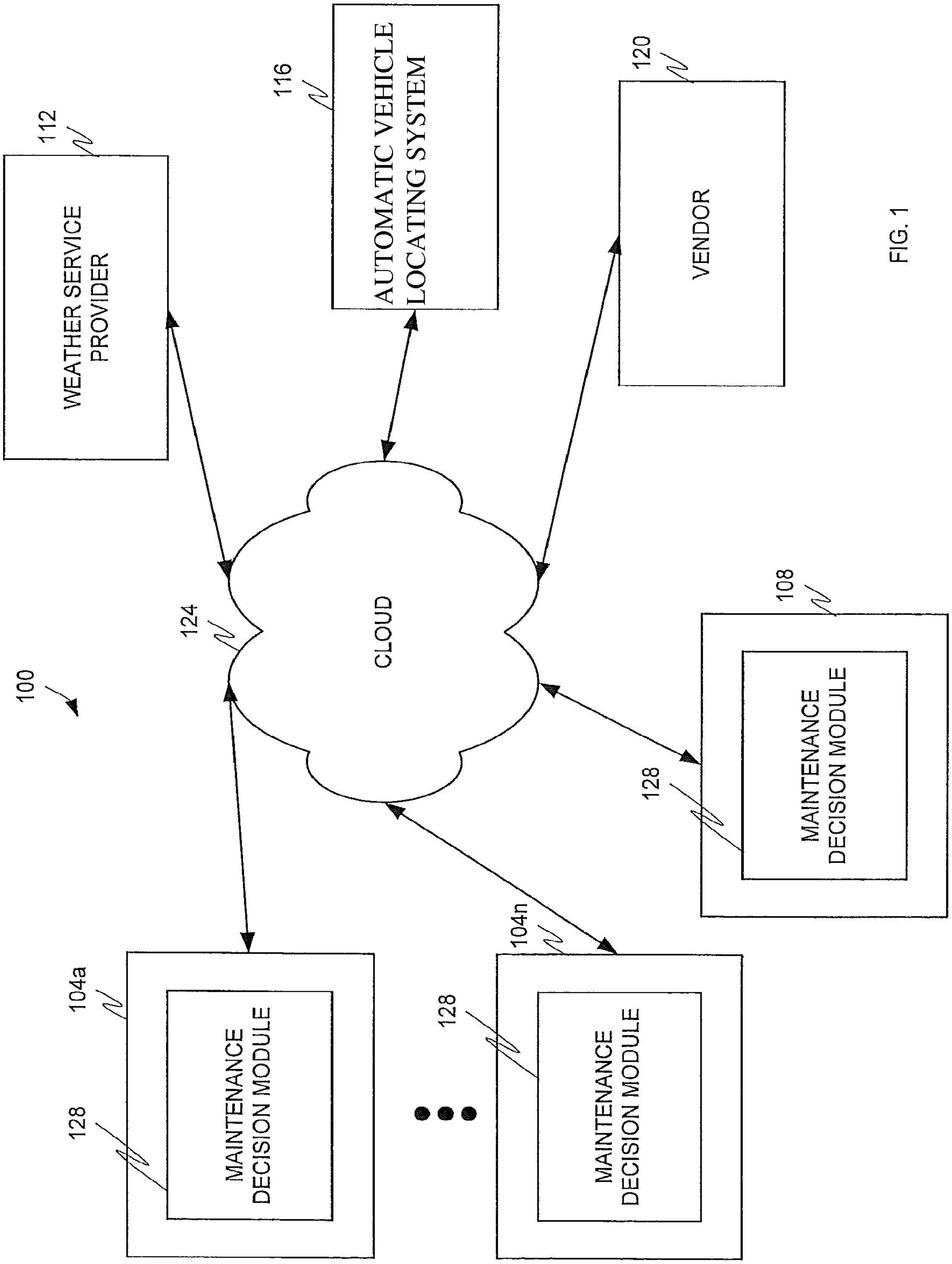
FIG. 1 is a block diagram of a network according to an embodiment.

In one embodiment, maintenance vehicles, such as trucks (e.g., snowplows), have on-board treatment material application algorithms and/or data structures to provide the operator with real-time or near real-time information regarding treatment material type, amount, concentration, and/or application rate to be applied to a roadway surface. The algorithms and/or data structures, for example, map a weather and/or traffic parameter (e.g., roadway surface temperature, wind speed and direction, solar thermal variable, precipitation level (e.g., snow depth, snow- or rain-fall rate, etc.), traffic volume, etc.) against one or more treatment material application parameters (e.g., treatment material type to be applied (e.g., sand, anti-icer, de-icer, etc.), treatment material performance specification or profile, treatment material amount, treatment material concentration, treatment material application rate, when and/or where to start application of the treatment material, and/or when and where to stop application of the treatment material). The algorithm may be two-, three-, four-, or more dimensional, depending on the application. An on-board computer, using the algorithm and operator input and/or sensor and/or other real-time input, determines a set of recommended treatment material application parameters. In one configuration, the algorithm maps roadway surface temperature against a treatment material application parameter. The parameters may be set manually by the operator and/or automatically by the computer. In one configuration, the operator input is road condition (e.g., road wet, dry, snow-packed, icy, etc.) In one configuration, the sensor input is ambient (external) temperature. In one configuration, the sensor input is loop radar from a Weather service provider (such as the National Weather Service). In one configuration, the input is a set of predicted weather conditions from a weather service provider.

In one embodiment, a maintenance vehicle, particularly a truck (e.g., a snowplow or other vehicle type), receives, from a weather service provider, loop radar, satellite image(s), and other weather forecast information and, from an operator and/or on-board sensor, sensed or collected information, such as road/track condition (e.g., dry, wet, snow-packed, etc.), outside ambient temperature, dew point, weather condition (e.g., raining, snowing, sunny, cloudy, etc.), traffic volume or level, etc. An on-board computer uses the input to determine, using stored algorithms and/or data structures such as those discussed above, recommended treatment material application parameters. The input received from the on-board sensor(s) and/or operator and/or treatment recommendations can be provided to a central server, such as a server of a weather service provider and/or other system, to refine a weather prediction model, dispatch or maintenance system, and/or road mapping or profiling module.

In one embodiment, a supervisor can receive weather information, automatic vehicle locating ("AVL") system collected information, and locally collected information and, remote from the AVL server, determine treatment recommendations on a maintenance vehicle-by-maintenance vehicle basis.

The Distributed Data Processing Network

An embodiment of the distributed maintenance system will now be discussed with reference to FIG. 1.

The system 100 includes, without limitation, a plurality of maintenance vehicles 104*a-n* operated by operators, a computer device 108 operated by a supervisor, dispatcher, or other non-operator, a weather service provider 112, an automatic vehicle locating ("AVL") system 116, and a vendor 120, all interconnected by a network cloud 124.

The maintenance vehicles 104*a-n* can be any type of maintenance vehicle and is typically operated by a governmental entity, such as a state, city, county, municipality, and the like or by a contractor to a governmental entity. An exemplary maintenance vehicle 104*a-n* is a snow and/or ice removal vehicle, such as a snow plow.

The computer device 108 can be any type of computer, including, without limitation, a laptop, personal computer, intelligent cellular phone, personal digital assistant, and the like.

The weather service provider 112 is a private or governmental entity that provides weather information. Examples of weather service providers include the National Weather Service ("NWS"), University Corporation for Atmospheric Research ("UCAR"), National Center for Atmospheric Research ("NCAR"), Meridian Environmental Technology Inc. ("Meridian"), Vaisala Inc. ("Vaisala"), and Televent GIT S.A. ("Televent").

"Weather information" refers to any information describing the state of the atmosphere at a particular time and place. Weather information includes, without limitation, current and/or future (predicted or forecasted) air temperature, solar thermal variable (e.g., sunny, cloudy, partially cloudy, visibility measure, sky condition, etc.), precipitation type (of whatever form, whether rain, snow, hail, ice, or combination thereof), precipitation rate, and/or precipitation amount, relative humidity, dew point, wind speed, wind direction, wind chill, pressure (altimeter), and barometric pressure.

Weather information can be presented in many forms, including, without limitation, as an associated value (measured relative to a determined scale, index, or rating) and optionally probability of occurrence or as a weather map or graphical weather information (e.g., visible and/or infrared satellite image, fixed or loop radar image (e.g., manually digitized radar, radar coded messages, or NEXTRAD data), NAM model forecast, surface data, upper air data, GFS model forecast, WRF model forecast, rapid update cycle ("RUC") forecast model, and European Center for Medium range Weather Forecasting (ECMWF) forecast model). The weather map may be refreshed after a determined period, such as a Doppler loop radar feed. The forecast may be for a specified time period, such as 1-hour, 4-hour, 6-hour, 8-hour, 12-hour, 18-hour, 24-hour, 48-hour, 72-hour, 10-day, and the like.

The AVL system 116 uses a satellite locating and positioning system, such as the Global Positioning System ("GPS"), to track, automatically, current and historic maintenance vehicle 104*a-n* locations, maintenance vehicle 104*a-n* current and historic state, maintenance vehicle current and anticipated dispatch information, and maintenance vehicle current and historic activities (hereinafter referenced as "AVL collected information. "Vehicle state" refers to a condition, function, location, or operation of a vehicle or a component or accessory thereof. In one configuration, the historic information is collected by on-board modems. The information can include vehicle speed, vehicle acceleration, engine revolutions-per-minute, engine temperature, engine oil pressure, fuel level, battery amperage, battery voltage, odometer setting, tire pressure, mileage per gallon, other onboard warning systems and sensors, weather conditions (such as temperature, humidity, wind speed and direction, wind chill, raining, snowing, blowing snow, foggy, clear, overcast, etc.), road conditions (e.g., icy, slushy, snow-packed, frosty, wet, dry, etc.), physical location (e.g., GPS-based location), snow plow setting (e.g., snowplow position and orientation such as plow up or down and angle relative to the truck longitudinal axis), mixture, application rate, and amount of a treatment material (e.g., an abrasive and/or de- or anti-icing material) applied to a selected roadway surface (e.g., salt level, sand level, magnesium sulfate level, other chemicals or treatment materials, and combinations thereof), when (e.g., timestamp) the treatment material was last applied to the selected roadway surface, video images of the vehicle's exterior environment or the vehicles' interior or exterior, audio of the vehicle's interior, radiation levels, roadway friction measures (one of ordinary skill in the art will readily appreciate that there are many sensors available in the marketplace to sense roadway friction, or lack thereof caused by the accumulation of ice, and that these sensors can be mounted on the maintenance vehicle and thereby collect roadway friction data in real-time as the maintenance vehicles traverses a given route), thermal and/or infrared imaging, traffic level (which can be quantified on a numerical scale), solar energy level (which can be quantified on a numerical scale), earliest dispatch time of next available snow maintenance vehicle to treat selected roadway, and other information which can be displayed, sensed and/or input, manually (typically visually by the operator) or on an automated basis.

The vendor 120 is a provider of one or more treatment materials on-board a selected maintenance vehicle. The vendor 120 can provide treatment material performance specifications, particularly profiles of the type depicted in FIG. 3. The treatment material performance specifications can be of any form that is processable by a computer processor.

The network 124 can be wired, wireless, or a combination thereof. In one configuration, the network 124 is a wireless network. The wireless network can be any type of wireless service and/or air interface, including, without limitation, time-, frequency-, and code-division multiple access, and combinations thereof, such as orthogonal frequency-division multiple access. Examples include WIMAX, LTE, Advanced Mobile Telephone Service or AMPS, Digital Advanced Mobile Telephone Service or D-AMPS, Digital Communication Service or DCS1800, Global System for Mobile Communications/General Packet Radio Service or GSM/GPSR, North American Digital Cellular, Personal Communications Services, Personal Digital Cellular, Total Access Communication System, High Speed Downlink Packet Access or HSDPA, Enhanced Data GSM Environment or EDGE, 1×RTT CDMA, CDMA2000, Evolution Data Optimized or EVDO, Digital Enhanced Network or iDEN, Specialized Mobile Radio or SMR, 802.11×, WiMAX or 802.16, and other public and private networks, with Frequency Division Multiple Access or FDMA, Time Division Multiple Access or TDMA, Code Division Multiple Access or CDMA, Cellular Digital Packet Data or CDPD, Wideband CDMA or WCDMA/UMTS, or others. The public or private network 124 can be either landline or wireless. Wireless networks can be operated by one or more private or public networks, including carriers, such as Sprint.™., Nextel.™., Verizon.™., Cingular.™., Alltel.™., Western Wireless.™., AT&T Wireless.™., Unicell.™., Westlink.™. and others, as well as affiliates thereof. Bandwidth and/or transmission speeds, and/or the frequency and method of data transmissions, may be intentionally limited (by setting appropriate modem parameters) to qualify for favorable telemetry rates.

Each of the maintenance vehicles 104*a-n* and computer device 108 includes a maintenance decision module 128. The maintenance decision module 128 will be described with reference to FIG. 2. The modem 200 may be provided with a memory 204 including a number of internal logic modules and other information for performing various operations. The memory 204 includes AVL collected information 208, treatment material performance specifications 212 (which may be in multiple forms for a selected treatment material and/or in the same form but for multiple treatment materials) that correspond to a treatment material on-board a selected maintenance vehicle, locally collected information 216, which refers to AVL-type information collected by a selected maintenance vehicle and stored locally, weather information 220, a system clock 224 that is synchronized to a universal time clock and provides internal timing information to control modem 200 operations and timestamp collected data, a unique identifier 228 which is different from a network address associated with the modem 200 (which thereby provides unique identification should the network address be non-static (or dynamically changing)), a map 232 which can take many forms, including without limitation one or more of the forms described in U.S. Pat. No. 7,714,705 and copending U.S. application Ser. No. 12/147,837 (in which the map provides satellite and/or radar weather information), operator instructions 236 received from the operator of the selected maintenance vehicle, vehicle physical location 240 (which typically is a set of spatial coordinates from the electrically connected satellite positioning module 908), and the maintenance decision module 128. The modem 200 is further connected to or integrated with one or more of the satellite positioning module 908, antenna 906, on-board sensors 252, video imaging device 256, user interface 260, and wireless network access card 264. Sensors 252 can be any device for collecting weather and/or AVL collected information 220 and 208, including, without limitation, surface and air temperature sensors. The memory 204 is used during normal data processing operations and as a buffer for data collected when the connection with the network is either unhealthy or down.

Figure 4:
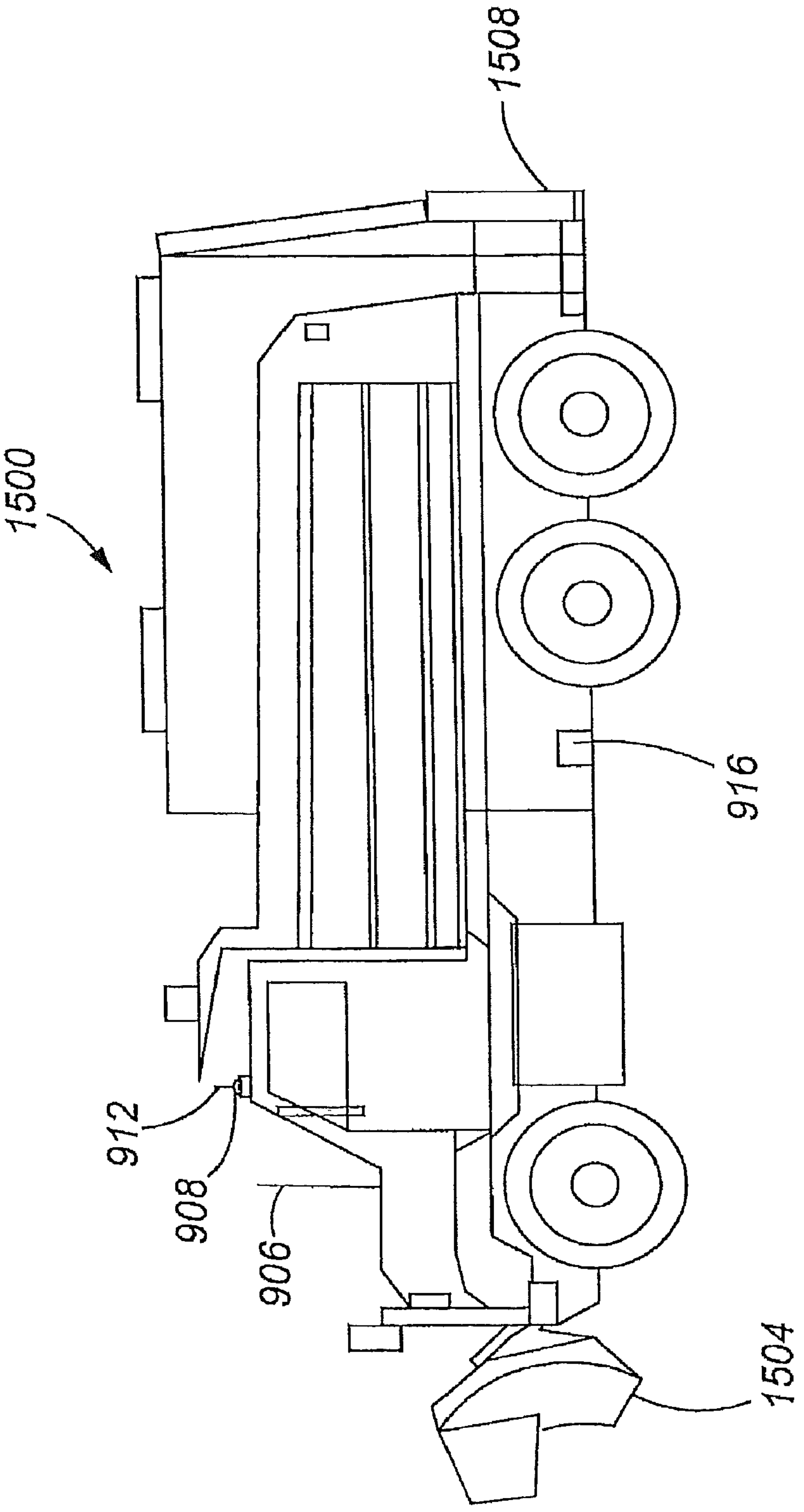
FIG. 4 is a snow maintenance vehicle according to an embodiment.

FIG. 4 depicts a snow maintenance vehicle, particularly a snow plow, according to an embodiment. The vehicle 1500 includes a snow plow 1504, an antenna 906 for duplexed communications, satellite positioning module 908 and a corresponding antenna 912, a roadway surface temperature sensor 916, and spreader 1508 connected to a treatment material container positioned in the bed of the snow maintenance vehicle. Although the characteristics (e.g., concentration and types) of the treatment materials on-board the vehicle 1500 are selected before deployment, it is possible that various types of treatment materials (such as one or more treatment materials and water) are contained in separate vessels or containers on the vehicle 1500 and mixed during deployment to provide desired treatment material characteristics. The specific treatment material(s) and corresponding characteristic(s) on board the vehicle 1500 can be entered into the memory 204 by the operator, supervisor, or other personnel, via a user interface or captured automatically by the maintenance decision module 128, such as by radio frequency identification techniques (with an active or passive tag on the vessel or container and a fixed or mobile reader on the vehicle 1500 and in communication with the modem 200). Other automated identification techniques may be employed, such as bar codes.

The maintenance decision module 128 performs a number of operations.

In one set of operations, it oversees operations of the modem 200, identifies the types of digital incoming signals (e.g., by sensor type) and, based on the type of incoming signal, translates the digital signals received from the sensors to a selected language or format, packetizes the collected data 216 with a data-type identifier included in the payload, and applies headers to the packets for uploading onto the network, handles mail and messaging functions, includes drivers and programming for the user interface, performs remote system maintenance and troubleshooting functions, and other functions.

In another set of operations, the maintenance decision module 128 processes and analyzes one or more of AVL collected information 208 (such as when a selected roadway segment was last treated, how it was treated, the amount of treatment material applied to the selected roadway segment, visually observed roadway condition of the selected roadway segment, visually observed traffic level on the selected roadway segment, visually observed precipitation type, rate, and/or accumulation), treatment material performance specifications 212, locally collected information 216 (such as how a selected roadway segment is currently being treated by the maintenance vehicle associated with the maintenance decision module 128, the amount of treatment material currently being applied to the selected roadway segment by the associated maintenance vehicle, current operator observed roadway condition of the selected roadway segment, current operator observed traffic level on the selected roadway segment, current operator observed precipitation type, rate, and/or accumulation), operator instructions 236, and weather information 220 to provide treatment recommendations, which may be specific to a specific location, route, roadway, etc., and responsive to one or more lane treatment efforts) to a local operator, a local or remote supervisor, and/or the AVL system 116 server and/or to automatically control on-board maintenance vehicle treatment operations consistent with the treatment recommendations. The treatment recommendations include, for example, a treatment material type (e.g., abrasive and/or de- or anti-icing material), treatment material application amount (e.g., pounds of treatment material per lane-mile), treatment material application rate (e.g., amount of treatment material per unit time), concentration of de- or anti-icing agent (e.g., amount of agent per unit volume of liquid solution), treatment material mixture composition (types of de- or anti-icing agents to be included in the composition), plowing strategy, pre-storm treatment strategy (which can include any of the prior elements), mid-storm treatment strategy (which can include any of the prior elements), post-storm treatment strategy (which can include any of the prior elements), a treatment location, and the like.

The treatment recommendations can be based on actual and/or predicted information, hypothetical information, or a combination thereof. The maintenance decision module 128 typically has a data ingest submodule to receive and universally format the various types of information, a road weather forecast submodule to dynamically weight one or more forecast models and forward error correction with observations, and a road condition and treatment submodule that, based on the output of the data ingest and road weather forecast submodules, forecasts road temperature and condition and maps the forecasts to a look up table of rules of practice for anti-icing and/or de-icing and/or plowing operations to provide treatment recommendations. The rules of practice commonly use treatment material performance specifications, such as eutectic curves, for differing types of treatment materials and dilution information. In one configuration, the maintenance decision module 128 uses known, developed or proprietary maintenance decision support system ("MDSS") algorithms, as may be provided by UCAR, NCAR, Vaisala, Televent, Meridian or others, the latter of which might for example include the MDSS Pro.™. product from Meridian, modified for use in a maintenance vehicle to provide treatment recommendations. MDSS Pro.™. uses a pavement model, which considers the interaction of a treatment material with weather, traffic, and other factors. In one configuration, the maintenance decision module 128 uses an algorithm capable of having as inputs not only weather information and AVL collected information but also maintenance vehicle operator and/or supervisor observations, such as traffic level, solar energy level, wind speed and direction, dilution, road (e.g. surface, grade, slope, and crown) and/or other factors. In one configuration, the maintenance decision module 128 uses any of the above algorithms along with a roadway profiling model that characterizes or defines selected segments of roadways associated with specific satellite location coordinates. The profiling model can include factors influencing the concentration or effectiveness of the treatment material as a function of time, including, without limitation, the tendency or potential of the selected roadway segment to accumulate snow drifts for differing wind directions, the longitudinal grade of the selected roadway segment (which affects the runoff quantity and/or rate), the transverse slope and crown of the selected roadway segment (which affects the runoff quantity and/or rate), the roadway surface temperature behavior (e.g., bridges commonly have lower roadway surface temperatures than roadway surfaces having a subsurface road bed), the tendency of the selected roadway surface to receive sunlight throughout the day (e.g., whether the selected roadway surface is fully shaded throughout the day, partially shaded throughout the day, or unshaded), the type and condition of the pavement, if any, on the selected roadway surface, and the like.

The treatment material can be a dry or wet abrasive solid particulate, such as sand or gravel, or a dry or wet de- or anti-icing agent, such as brine and other salt-containing liquid or solid solutions. Exemplary de- or anti-icing agents include magnesium chloride (MgCl.sub.2), sodium chloride (NaCl), potassium chloride (KCl), calcium chloride (CaCl-.sub.2), calcium magnesium acetate (CMA) (a combination of CaCO.sub.3, MgCO.sub.3, and acetic acid (CH.sub.3COOH)), potassium acetate (KAc) (CH.sub.3COOK), CMS-B.™. or Motech.™., CG-90 Surface Saver.™., Verglimit.™., ethylene glycol (or ethane-1,2 diol), urea (NH.sub.2CONH.sub.2), and methanol (CH.sub.3OH), to name but a few. The treatment material can be sprayed directly onto a roadway or onto an abrasive solid particulate, which is then applied to a roadway. The treatment material can be applied to the roadway before, during, and/or after a precipitation event.

Figure 3:
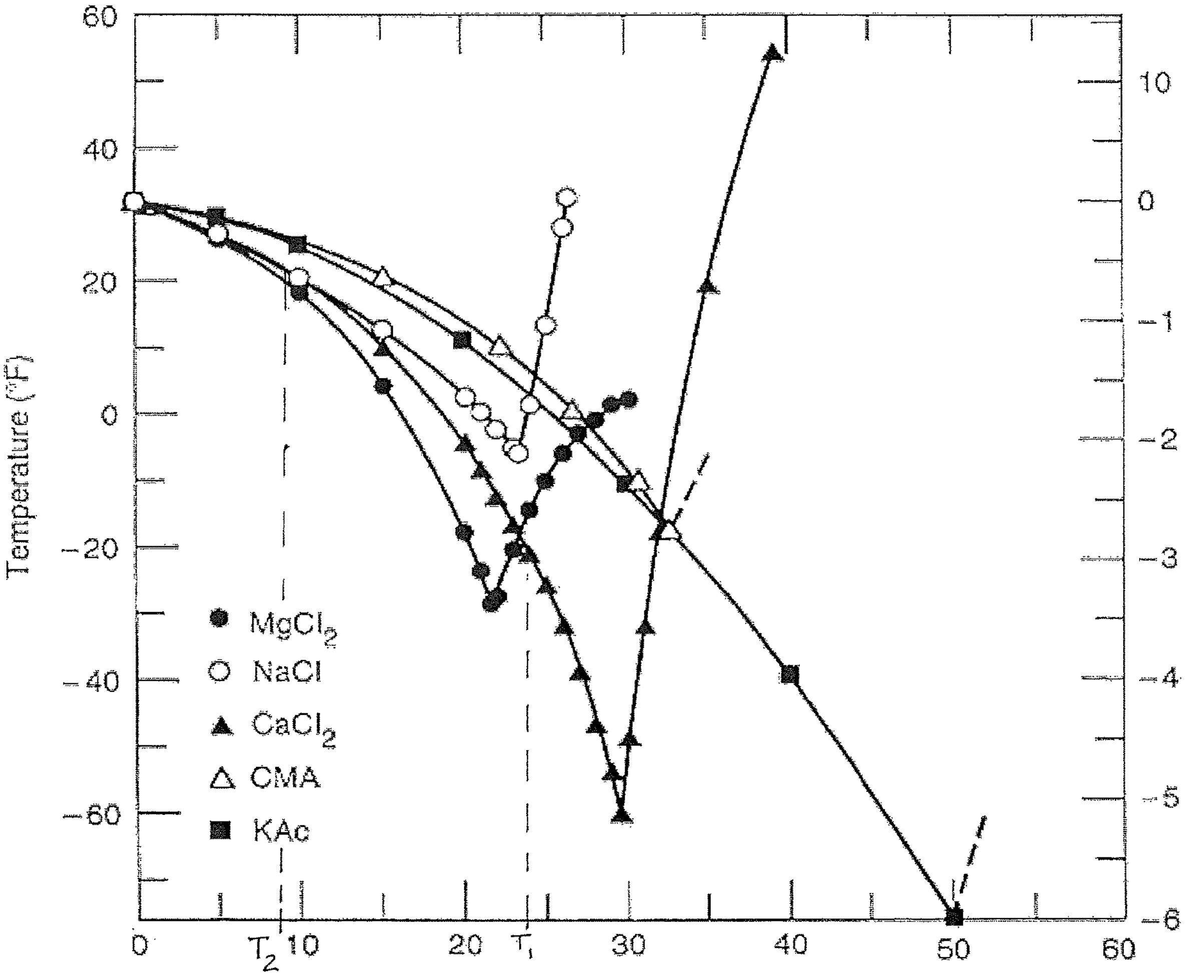
FIG. 3 is an exemplary prior art plot of temperature (.degree. F.) and (.degree. C.) (vertical axis) against solution concentration (% by weight) (horizontal axis) for various freeze point depressants or de- or anti-icing materials.

Prior to discussing examples illustrating the operation of the maintenance decision module 128, treatment material performance specifications or profiles will be explained. Referring to FIG. 3, a phase diagram for various de- and/or anti-icing agents is provided. One of ordinary skill in the art will readily appreciate that the addition of a de-icing or anti-icing agent, commonly in the form of a salt, to water will decrease the temperature at which the water freezes. This is known a depressing the freezing point. For example, and referring now to FIG. 3, Potassium acetate (KAc) at a concentration of 50% by weight has the highest water freezing point depression. This concentration of potassium acetate will depress the freezing point of water from 32.degree. F. to −80.degree. F. On the other hand, sodium chloride (NaCl) at a concentration of 23% by weight has the lowest water freezing point depression, depressing the freezing point from 32.degree. F. to −5.degree. F. As precipitation falls or evaporates and/or as traffic moves a treatment material off the roadway, the effective concentration of the treatment material will change, causing a change in the effective freezing point depression. As concentration decreases, the effective freezing point depression will decrease, and, as concentration increases, the effective freezing point depression will increase. At periodic intervals, the treatment material will need to be reapplied to the roadway surface to control ice formation. For example, at time T.sub.1, the concentration of calcium chloride on a selected roadway surface is 24% by weight and freezing point depression is about −20.degree. F., and, at later time T.sub.2, the calcium chloride concentration on the selected roadway surface has decreased, as a result of traffic and continued precipitation, to 9% by weight and the freezing point depression is about 21.degree. F. At time T.sub.1, the selected roadway surface has a temperature of 5.degree. F. and, at time T.sub.2 due to a drop in the ambient air temperature, of about 0.degree. F. As will be appreciated, surface prediction modeling software is available to characterize the thermal response of surface temperature to various factors including ambient air temperature. Although the calcium chloride will prevent ice formation at time T.sub.1, it will not have a significant retardant effect on ice formation at time T.sub.2, unless the treatment material is reapplied to the selected roadway surface. As will be appreciated, the ability to predict successfully the effect of precipitation (through snow- or rainfall, and wind speed and direction (which will cause drifting)) and traffic on treatment material concentration on the roadway surface and the impact of air temperature and solar energy (from sunlight) on surface temperature can be important to controlling effectively application and re-application of treatment material and therefore ice formation.

In a first operational example, a snow plow has sodium chloride and sand on board and is applying both treatment materials to a roadway during a snow storm. The snow storm currently (at 6 am on Monday) has a precipitation rate of about 1 inch of snow accumulation per hour, a surface temperature is about 30.degree. F., an ambient air temperature is about 20.degree. F., a wind speed of 15 mph, a wind direction of westerly, and solar thermal variable is low. The snow storm 6-hour forecast is a continuing (average) precipitation rate of about 1 inch of snow accumulation per hour, the surface temperature will drop to about 25.degree. F., the ambient air temperature will rise to about 25.degree. F. (maximum), the wind speed will remain constant at about 15 mph with no change in wind direction, and solar thermal variable will remain low. This information is provided to the modem 200 by the weather service provider 112 server. The AVL system 116 server further provides to the modem 200 collected information indicating that a selected section of roadway was last treated with a 10% by weight liquid sodium chloride at 3 am. The modem 200 further knows by RFID techniques that the on board sodium chloride has a concentration of 15% by weight. The snow plow operator further inputs into the modem that traffic is currently light but will increase to a high level from 7 am to 9 am as rush hour approaches. In response to these factors, the maintenance decision module 128 recommends to the driver that he apply both sand and sodium chloride, with a sodium chloride application rate of 100 gallons per lane mile. This will substantially inhibit ice formation during rush hour. The module 128 further recommends that the sodium chloride be reapplied no later than 10 am.

Another operational example uses the information set forth in the prior example with the exception that the storm is predicted to stop at 10 am followed by a cloudless sky at 11 am. Using this information, the maintenance decision module 128 recommends that no further treatment material be applied after the current maintenance vehicle. The solar energy from the sun will increase surface temperature and melt the snow on the roadway in the absence of additional treatment material.

In another operational example, a supervisor, via a laptop computer containing a maintenance decision module 128 and connected remotely, over a public and/or untrusted network, to modems 200 and the AVL server, is able to determine, for a set of satellite position coordinates, a set of treatment recommendations to be used by snow maintenance vehicles under his supervision. The supervisor is able to access, for a selected set of satellite position coordinates, weather information 220 from a weather service provider 112 server, collected information 208 from an AVL system 116 server, and treatment material performance specifications 212 from a vendor 120, and locally collected information 216 from a selected snow maintenance vehicle. The supervisor may not be himself operating a maintenance vehicle.

Figure 5:
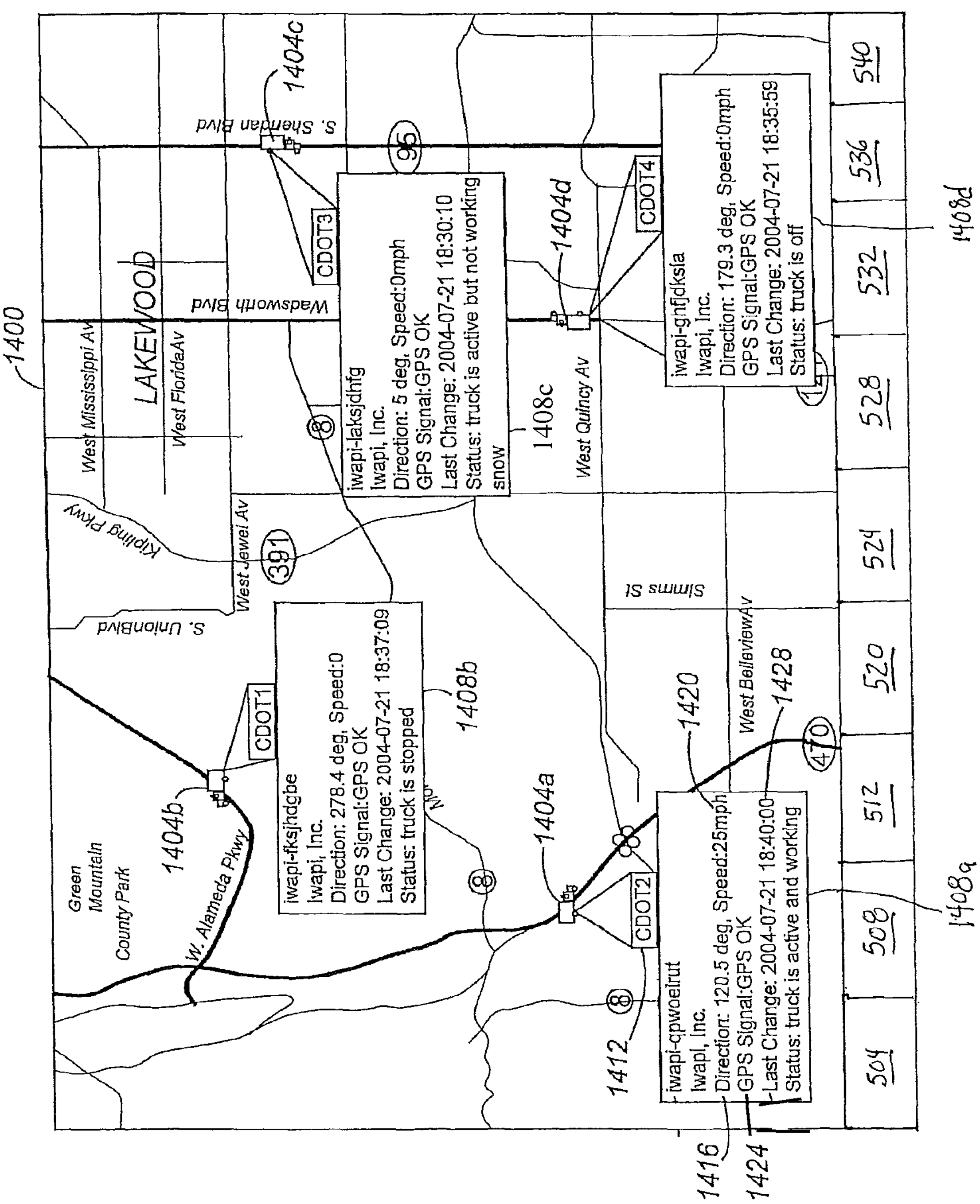
FIG. 5 depicts signal flows among the maintenance decision module, WSP, AVL, and vendor according to an embodiment.

The information can be easily accessed by the supervisor using the map display of FIG. 5. As can be seen from FIG. 5, the spatial map 1400 shows vehicle locations, vehicle operations, and other state information. For example, the map 1400 can depict the location of each of a number of snowplow trucks 1500 (FIG. 4) using an icon 1404*a-d* denoting each truck. The icon 1404 color can be varied to indicate differing vehicle states. Text information 1408*a-d* can be depicted on the map adjacent to or associated with each icon 1404. The text information 1408 can describe selected state information associated with the truck 1500, such as a truck identifier 1412, direction of travel 1416, speed 1420, status of GPS signal 1424, and timestamp 1428 of last data update for the identified truck. The map 1400 can also depict, for a selected vehicle, a trace route over a selected period of time. By selecting a particular truck icon 1404, the supervisor is able to view not only the particular information collected by the AVL system 116 from the truck but also a live video feed of the roadway (via the video imaging device 256). Although not depicted, the map can include one or more sensor icons depicting a stationary meteorological sensor, pavement sensor, roadway cam, and/or weather cam and, by selecting the sensor icon, view the associated media or multimedia information being collected.

The map can further include a tool bar 500 including a series of user selectable options. The options include use currently sensed satellite position 504, select new sensed satellite position 508 (which is done by selecting the option and selecting, on the map, from a drop-down list, or otherwise, a desired map location), use collected information for current satellite position 512 (the collected information refers to the weather information 220, AVL collected information 208 and locally collected information 216), edit collected information 520 (which permits the user to edit the collected information to determine treatment recommendations for a "what-if" or hypothetical scenario for the current satellite position), view weather information for current satellite position 524, view AVL collected information for current satellite position 528, view current treatment recommendations for the current satellite position 532, determine treatment recommendations 536 (using unedited or edited information), and edit treatment recommendations 540.

Using these options, the supervisor can select a satellite position, view various types of past, current, and future information (including the information discussed above), edit the information, and determine treatment recommendations. The treatment recommendations can be determined not only for the unedited information but also for edited information. In this manner, the supervisor can determine different treatment recommendations for different scenarios and customize the treatment recommendations for the current satellite position. The supervisor further has the ability to edit the treatment recommendations before transmittal. This information can be forwarded directly to a selected maintenance vehicle or indirectly to the selected maintenance vehicle via the AVL system 116 server. As will be appreciated, a maintenance vehicle operator can use the same features and perform the same maintenance decision module activities as the supervisor.

Figure 2:
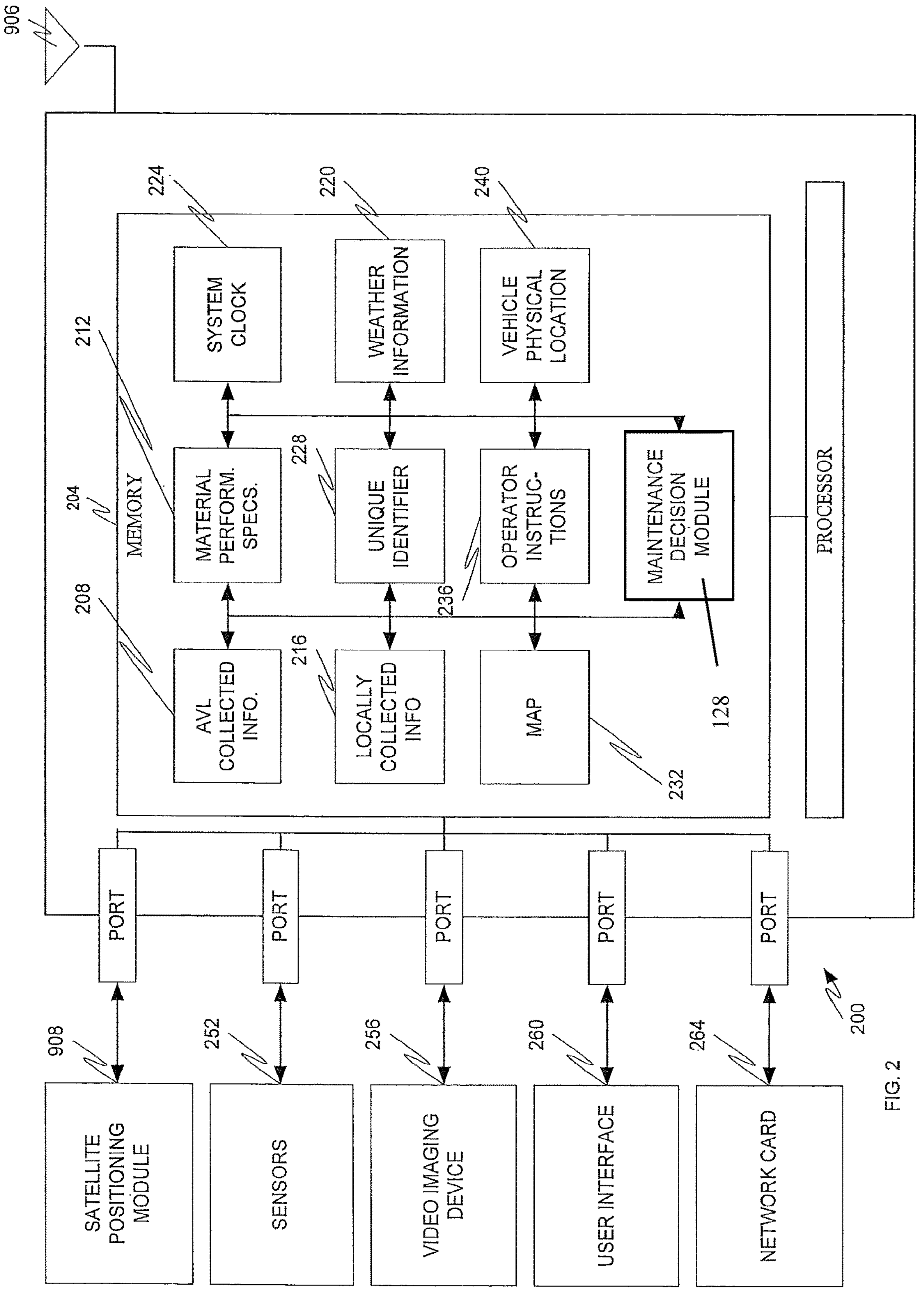
FIG. 2 is a block diagram of an on-board computer according to an embodiment.

While the various components in FIG. 2 have been described with reference to a modem, it is to be understood that one or more of the components may also be connected to or stored in the computer device 108.

Operation of the Maintenance Decision Module

Figure 6:
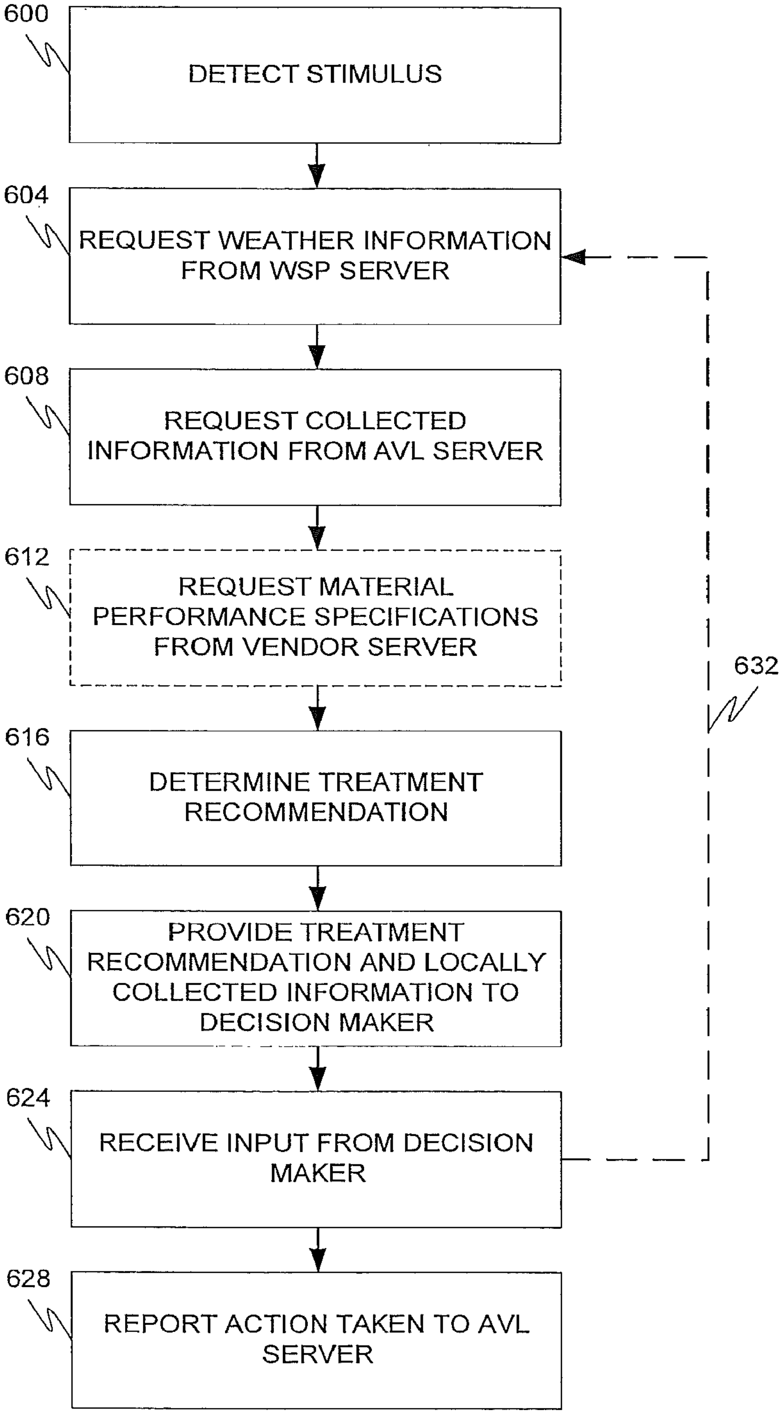
FIG. 6 is flow chart according to an embodiment.
Figure 7:
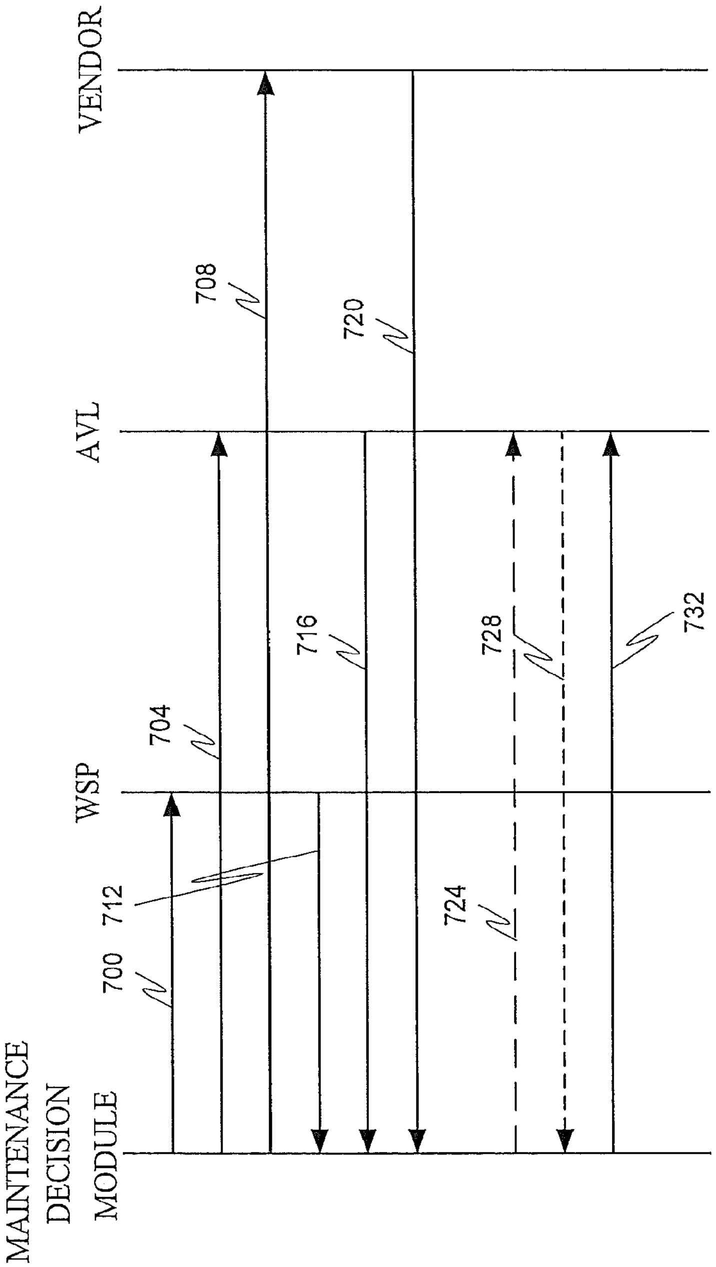
FIG. 7 depicts signal flows among the maintenance decision module, WSP, AVL, and vendor according to an embodiment.

With reference to FIGS. 6-7, a first operational embodiment will be discussed.

In step 600, the maintenance decision module 128 detects a stimulus. Exemplary stimuli include time value, operator or user input, or a change in monitored parameters such as ambient or surface temperature, location, or traction.

In step 604, the maintenance decision module 128, in response to the detected stimulus, requests 700 updated weather information 220 from the weather service provider 112 server.

In step 608, the maintenance decision module 128 requests 704 updated AVL collected information 208 from the AVL 116 server.

In optional step 612, the maintenance decision module 128 requests 708 material performance specifications 212 from the vendor 120 server.

The weather service provider, AVL, and vendor servers provide responses 712, 716, and 720, respectively.

In step 616, the maintenance decision module 128 determines treatment recommendations based on the information.

In step 620, the maintenance decision module 128 provides treatment recommendations and locally collected information to a decision maker. The decision maker may be the maintenance vehicle operator, a supervisor, a dispatcher, the AVL server, or a combination thereof.

In step 624, the maintenance decision module 128 receives input from the decision maker. The input may be edits to the treatment recommendations, locally collected information, weather information, material performance specifications, AVL collected information, or a combination thereof. When requested, the maintenance decision module returns 632 to step 604 and repeats the foregoing steps. The optional provision of the treatment recommendations to the AVL server and the response therefrom are shown by signals 724 and 728, respectively. The input may also be an indication that the treatment recommendation is accepted and will be, is being, or has been performed.

In step 628, the maintenance decision module 128 reports 732 the action taken to the AVL 116 server.

Figure 8:
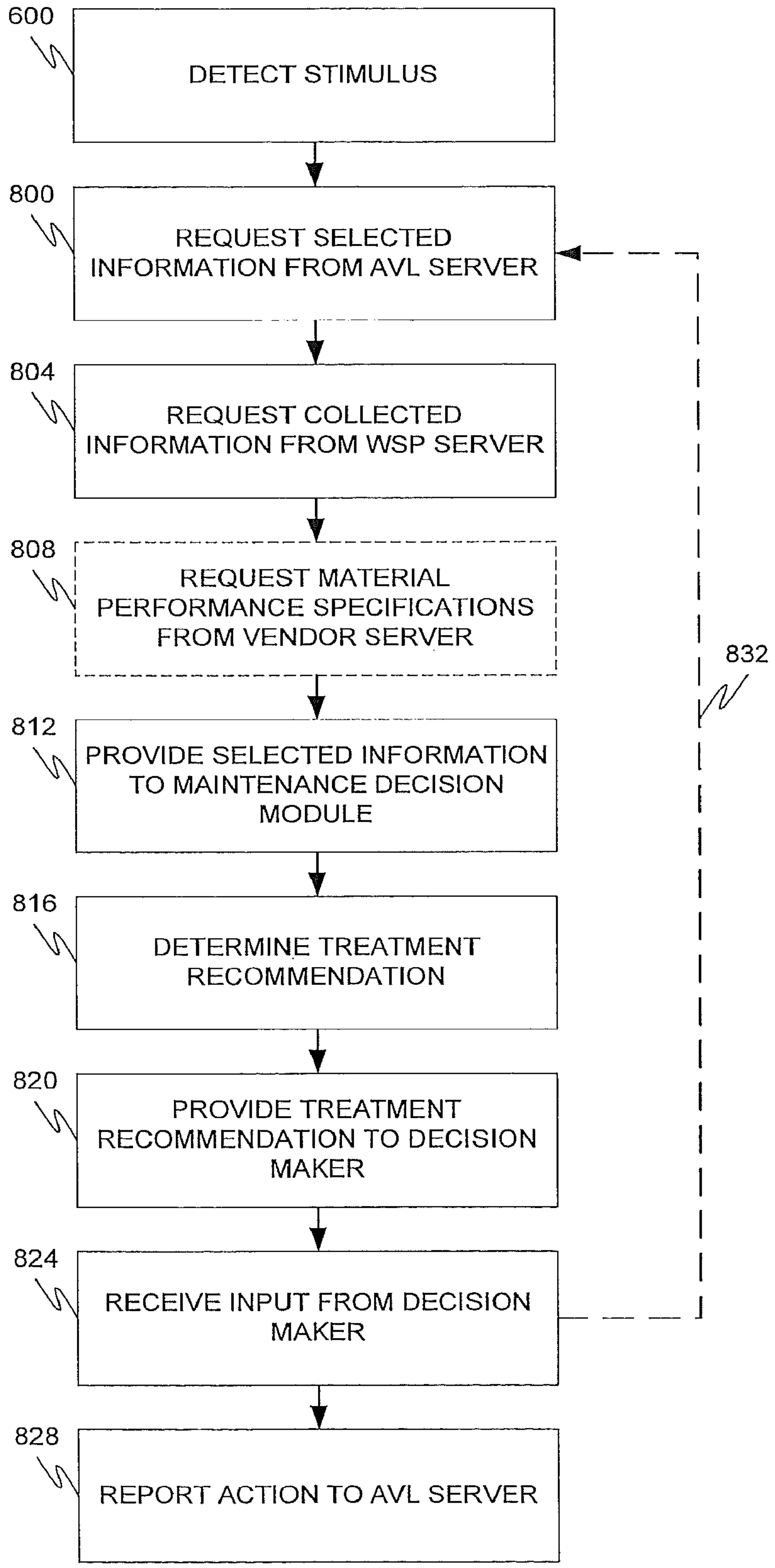
FIG. 8 is flow chart according to an embodiment.
Figure 9:
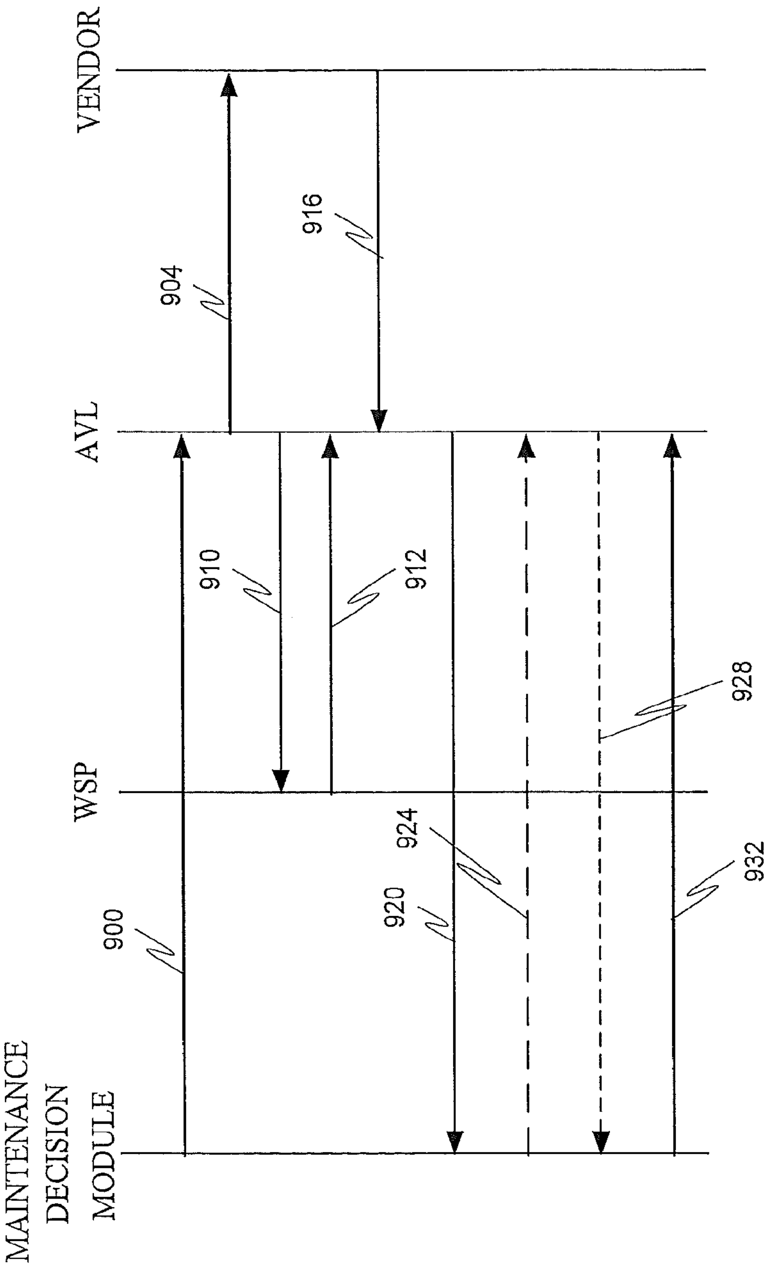
FIG. 9 depicts signal flows among the maintenance decision module, WSP, AVL, and vendor according to an embodiment.

With reference to FIGS. 8-9, a second operational embodiment will be discussed.

In step 600, the maintenance decision module 128 detects a stimulus.

In step 800, the maintenance decision module 128, in response to the detected stimulus, requests 900 updated selected information from the AVL server.

In step 804, the AVL server, in response, requests 904 weather information 220 from the weather service provider 112 server.

In optional step 808, the maintenance decision module 128 requests 910 material performance specifications 212 from the vendor 120 server.

The weather service provider and vendor servers provide responses 912 and 916, respectively.

In step 812, the AVL server provides 920 the selected information to the maintenance decision module 128.

In step 816, the maintenance decision module 128 determines treatment recommendations based on the information.

In step 820, the maintenance decision module 128 provides treatment recommendations and locally collected information to a decision maker. The decision maker may be the maintenance vehicle operator, a supervisor, a dispatcher, the AVL server, or a combination thereof.

In step 824, the maintenance decision module 128 receives input from the decision maker. The input may be edits to the treatment recommendations, locally collected information, weather information, material performance specifications, AVL collected information, or a combination thereof. When requested, the maintenance decision module returns 832 to step 804 and repeats the foregoing steps. The optional provision of the treatment recommendations to the AVL server and the response therefrom are shown by signals 924 and 928, respectively. The input may also be an indication that the treatment recommendation is accepted and will be, is being, or has been performed.

In step 828, the maintenance decision module 128 reports 932 the action taken to the AVL 116 server.

In the above operational examples, the modem 200 commonly accesses information from servers by directing the information request to a specified universal resource indicator ("URI") or locator ("URL") associated with a selected server. In other words, the modem 200 pulls the desired information from the server as opposed to the server pushing the desired information to the modem 200. In one configuration, the modem 200 accesses the desired information from a web page associated with the URI or URL. This is done due to dynamically changing network (typically Internet Protocol ("IP")) addresses for the modem. When static IP addresses are associated with the modems, the server can push the desired information to the static IP address of the selected modem.

The information is typically converted into a selected form, packetized, and transmitted over the wireless network. The form of the information can be in accordance with any selected language, such as the eXtensible Markup Language or XML, the HyperText Markup Language or HTML, Remote Method Invocation or RMI, or Direct Socket Connections. The packets can be transported using any suitable protocol, such as the Transport Control Protocol/Internet Protocol suite of protocols, Simple Object Access Protocol, or User Datagram Protocol.

The connection may be terminated involuntarily or voluntarily by the modem 200 in response to a set of predetermined trigger events. One trigger event is a command by the user. Another trigger is when the received signal strength from the network falls below a selected threshold. Signal strength may be measured using the mechanisms currently used by cell phones to measure and report the signal strength to the user, even though the user has not yet placed a call. Yet another trigger is one or more selected quality of service (QoS) parameters falling below a corresponding predetermined threshold. Exemplary QoS parameters include packet loss, jitter, latency, etc. Notwithstanding the loss of connection, the maintenance decision module 128 may continue operation and determine treatment recommendations during connectivity loss.

Data collection by the modem may be periodic or continuous. Periodic data collection may be based on one or more trigger events, such as the passage of a selected time interval, passage of a given number of data entries (either in total or sorted by parameter), detection of a change in one or more selected state parameters or variables, or receipt of a data transmission command by a user. When collected data collection is to be transmitted and the connection is either down or up but unhealthy, the modem buffers the data in the memory 204 while the monitor attempts to reestablish the connection with the same or a different network. When the connection is reestablished, the data is transmitted via the network to the remote server.

A number of variations and modifications of the invention can be used. It would be possible to provide for some features of the invention without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA.RTM. or CGI script, as a resource residing on a server or computer workstation, as a routine embedded in a dedicated measurement system, system component, or the like. The system can also be implemented by physically incorporating the system and/or method into a software and/or hardware system.

The exemplary systems and methods of this disclosure have been described in relation to a distributed processing network. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a modem, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A snow maintenance vehicle, comprising:
- a snow plow;
- an antenna for duplexed communications;
- a satellite positioning module and a corresponding antenna;
- a roadway surface temperature sensor;
- a spreader connected to a treatment material container;
- a maintenance decision module wherein said module processes and analyzes AVL collected information received from a server, and one or more of treatment material performance specifications, locally collected information, operator instructions, and weather information to provide treatment recommendations;
- wherein the AVL collected information comprises historic maintenance vehicle parameters; and
- wherein the maintenance decision module further comprises at least one of the following: a data ingest submodule to receive and universally format the various types of information, a road weather forecast submodule to dynamically weight one or more forecast models and forward error correction with observations, and a road condition and treatment submodule that, based on the output of the data ingest and road weather forecast submodules, forecasts road temperature and condition and maps the forecasts to a look up table of rules of practice for anti-icing, de-icing and/or plowing operations to provide treatment recommendations.

2. The snow maintenance vehicle of claim 1, wherein an identity of a material contained in the treatment material container and a set of corresponding characteristics of said material are entered into the maintenance decision module via a user interface, by at least one of the following: an operator, a supervisor, or other personnel.

3. The snow maintenance vehicle of claim 1, wherein an identity of a material contained in the treatment material container and a set of corresponding characteristics of said material are captured automatically by the maintenance decision module via radio frequency identification techniques or bar codes.

4. The snow maintenance vehicle of claim 1, wherein the treatment recommendations are provided to at least one of the following: a local operator, a local supervisor, a remote supervisor and an AVL system server.

5. The snow maintenance vehicle of claim 1, wherein the treatment recommendations automatically control an on-board maintenance vehicle treatment operation consistent with the treatment recommendations.

6. The snow maintenance vehicle of claim 1, wherein the treatment recommendations include at least one of the following: a treatment material type, a treatment material application amount, a treatment material application rate, a concentration of de- or anti-icing agent, a treatment material mixture composition, a plowing strategy, a pre-storm treatment strategy, a mid-storm treatment strategy, a post-storm treatment strategy, and a treatment location.

7. The snow maintenance vehicle of claim 1, wherein the AVL information also includes at least one of the following: information showing when a selected roadway segment was last treated, information showing how the selected roadway was treated, information showing the amount of treatment material applied to the selected roadway segment, a visually observed roadway condition of the selected roadway segment, a visually observed traffic level on the selected roadway segment, and a visually observed precipitation type, rate, and/or accumulation.

8. The snow maintenance vehicle of claim 1, wherein the locally collected information includes at least one of the following: information describing how a selected roadway segment is currently being treated by the maintenance vehicle associated with the maintenance decision module, information showing the amount of treatment material currently being applied to the selected roadway segment by the associated maintenance vehicle, current operator observed roadway condition of the selected roadway segment, current operator observed traffic level on the selected roadway segment, current operator observed precipitation type, rate, and/or accumulation.

9. The snow maintenance vehicle of claim 1, wherein the maintenance decision module uses known, developed or proprietary maintenance decision support system algorithms and the treatment recommendations are based on at least one of actual information, predicted information, hypothetical information, or a combination thereof.

10. A method comprising:
- providing a snow plow, having an antenna for duplexed communications, a satellite positioning module and a corresponding antenna, a roadway surface temperature sensor, a spreader connected to a treatment material container; and providing a maintenance decision module wherein said module:
- processes and analyzes AVL collected information received from a server and one or more of treatment material performance specifications, locally collected information, operator instructions, and weather information, and provides treatment recommendations based thereon;
- wherein the AVL collected information comprises historic maintenance vehicle parameters; and wherein the maintenance decision module further comprises at least one of the following: a data ingest submodule to receive and universally format the various types of information, a road weather forecast submodule to dynamically weight one or more forecast models and forward error correction with observations, and a road condition and treatment submodule that, based on the output of the data ingest and road weather forecast submodules, forecasts road temperature and condition and maps the forecasts to a look up table of rules of practice for anti-icing, de-icing and/or plowing operations to provide treatment recommendations.

11. The method of claim 10, wherein an identity of a material contained in the treatment material container and a set of corresponding characteristics of said material are entered into the maintenance decision module via a user interface, by at least one of the following: an operator, a supervisor, or other personnel.

12. The method of claim 10, wherein an identity of a material contained in the treatment material container and a set of corresponding characteristics of said material are captured automatically by the maintenance decision module via radio frequency identification techniques or bar codes.

13. The method of claim 10, wherein the treatment recommendations are provided to at least one of the following: a local operator, a local supervisor, a remote supervisor and an AVL system server.

14. The method of claim 10, wherein the treatment recommendations automatically control an on-board maintenance vehicle treatment operation consistent with the treatment recommendations.

15. The method of claim 10, wherein the treatment recommendations include at least one of the following: a treatment material type, a treatment material application amount, a treatment material application rate, a concentration of de- or anti-icing agent, a treatment material mixture composition, a plowing strategy, a pre-storm treatment strategy, a mid-storm treatment strategy, a post-storm treatment strategy, and a treatment location.

16. The method of claim 10, wherein the AVL information also includes at least one of the following: information showing when a selected roadway segment was last treated, information showing how the selected roadway was treated, information showing the amount of treatment material applied to the selected roadway segment, a visually observed roadway condition of the selected roadway segment, a visually observed traffic level on the selected roadway segment, and a visually observed precipitation type, rate, and/or accumulation.

17. The method of claim 10, wherein the locally collected information includes at least one of the following: information describing how a selected roadway segment is currently being treated by the maintenance vehicle associated with the maintenance decision module, information showing the amount of treatment material currently being applied to the selected roadway segment by the associated maintenance vehicle, current operator observed roadway condition of the selected roadway segment, current operator observed traffic level on the selected roadway segment, current operator observed precipitation type, rate, and/or accumulation.

18. The method of claim 10, wherein the maintenance decision module uses known, developed or proprietary maintenance decision support system algorithms and the treatment recommendations are based on at least one of actual information, predicted information, hypothetical information, or a combination thereof.

* * * * *